US011945418B2

United States Patent
Lehman et al.

(10) Patent No.: US 11,945,418 B2
(45) Date of Patent: Apr. 2, 2024

(54) METHOD FOR ATTACHING A LEVELING SYSTEM

(71) Applicant: Quadra Manufacturing, Inc., White Pigeon, MI (US)

(72) Inventors: Johnnie Eugene Lehman, Osceola, IN (US); Gary Anthony Lehman, Vicksburg, MI (US); Robert Daniel Slack, White Pigeon, MI (US)

(73) Assignee: Quadra Manufacturing, LLC, White Pigeon, MI (US)

( * ) Notice: Subject to any disclaimer, the term of this patent is extended or adjusted under 35 U.S.C. 154(b) by 0 days.

(21) Appl. No.: 17/065,215

(22) Filed: Oct. 7, 2020

(65) Prior Publication Data

US 2021/0016750 A1  Jan. 21, 2021

Related U.S. Application Data

(60) Division of application No. 16/140,230, filed on Sep. 24, 2018, now Pat. No. 10,821,944, which is a continuation-in-part of application No. 15/703,228, filed on Sep. 13, 2017, now Pat. No. 10,759,396.

(60) Provisional application No. 62/394,900, filed on Sep. 15, 2016.

(51) Int. Cl.
*B60S 9/02* (2006.01)
*B60S 9/04* (2006.01)
*B62D 21/02* (2006.01)

(52) U.S. Cl.
CPC .............. *B60S 9/04* (2013.01); *B62D 21/02* (2013.01)

(58) Field of Classification Search
CPC ...... B60S 9/00; B60S 9/02; B60S 9/08; B60S 9/12; B60S 9/22; B60S 9/04; B60S 9/06; B60S 9/10; B62D 21/02
See application file for complete search history.

(56) References Cited

U.S. PATENT DOCUMENTS

| | | | | |
|---|---|---|---|---|
| 2,747,836 A | * | 5/1956 | Sherman | B60S 9/04 254/425 |
| 3,733,051 A | * | 5/1973 | Bollinger | B60S 9/04 254/94 |
| 3,776,569 A | * | 12/1973 | Carmel | B60S 9/22 280/789 |

(Continued)

OTHER PUBLICATIONS

"Jack Mounting Bracket Catalog." http://www.hwhcorp.com/m110049.pdf. HWH Corporation, Moscow, Iowa. 57 pages. Last modified: Feb. 10, 2021.

(Continued)

*Primary Examiner* — James M Dolak
(74) *Attorney, Agent, or Firm* — Larry E. Henneman, Jr.; Henneman & Associates, PLC

(57) ABSTRACT

A vehicle leveling system includes a jack adapted to be mounted to a vehicle frame without modifying the vehicle frame. In a particular embodiment, the jack includes a first bracket adapted to urge against the bottom and side surfaces of a member of the frame and configured to be fastened to a member of the frame through a manufacturer-provided aperture in the frame. The jack additionally includes a second bracket to couple the first bracket to the jack. In a more particular embodiment, the first bracket includes a horizontal adjustment feature, and the second bracket includes a vertical adjustment feature.

16 Claims, 23 Drawing Sheets

(56) References Cited

U.S. PATENT DOCUMENTS

| | | | | |
|---|---|---|---|---|
| 4,084,789 A * | 4/1978 | Francis | | B60S 9/04 |
| | | | | 254/418 |
| 4,623,125 A * | 11/1986 | Ebey | | B60D 1/66 |
| | | | | 254/418 |
| 6,145,813 A * | 11/2000 | Anderson | | B60S 9/08 |
| | | | | 254/418 |
| 6,802,941 B2 * | 10/2004 | Zebuhr | | B01D 5/0072 |
| | | | | 159/48.1 |
| 6,840,541 B2 * | 1/2005 | Walters | | B60S 9/08 |
| | | | | 254/420 |
| 7,044,445 B1 * | 5/2006 | Crawford | | B60S 9/08 |
| | | | | 254/425 |
| 7,726,690 B1 | 6/2010 | James et al. | | |
| 8,220,833 B2 * | 7/2012 | Van Der Plaats | | B60D 1/66 |
| | | | | 280/764.1 |
| 9,656,637 B2 * | 5/2017 | Kimener | | B60S 9/08 |
| 10,759,396 B2 * | 9/2020 | Lehman | | B60S 9/02 |
| 10,821,944 B2 * | 11/2020 | Lehman | | B60S 9/04 |
| 10,899,320 B1 * | 1/2021 | Speirs | | B60D 1/66 |
| 11,208,082 B1 * | 12/2021 | Garceau | | G05D 1/0016 |
| 11,377,075 B2 * | 7/2022 | Beik | | B60S 9/06 |
| 11,390,254 B2 * | 7/2022 | Pursifull | | B60S 9/22 |
| 11,433,859 B2 * | 9/2022 | Jones | | B60S 9/04 |
| 11,434,116 B2 * | 9/2022 | Resendiz | | B60S 9/12 |
| 11,465,597 B2 | 10/2022 | Gallego | | |
| 11,511,979 B2 * | 11/2022 | Zimmerman | | B60S 9/22 |
| 11,524,662 B2 * | 12/2022 | Fischer | | B60S 9/04 |
| 11,565,665 B2 * | 1/2023 | Jasper | | F16C 33/74 |
| 11,565,666 B1 * | 1/2023 | Thorndyke | | B60S 9/12 |
| 11,584,624 B1 | 2/2023 | Christensen | | |
| 11,597,357 B2 | 3/2023 | Wallmeijer et al. | | |
| 11,608,037 B1 | 3/2023 | Swanson | | |
| 11,618,417 B1 | 4/2023 | Mitchell | | |
| 11,628,812 B2 | 4/2023 | Kimener | | |
| 2007/0012132 A1 * | 1/2007 | McConnell | | B60S 9/08 |
| | | | | 74/424.71 |
| 2014/0049033 A1 * | 2/2014 | Yee | | B62D 21/02 |
| | | | | 280/797 |
| 2014/0367626 A1 * | 12/2014 | Okerlund | | B66F 3/16 |
| | | | | 254/420 |

OTHER PUBLICATIONS

U.S. Appl. No. 17/164,740, Office Action dated Sep. 30, 2022.
U.S. Appl. No. 17/164,740, Office Action dated Feb. 24, 2023.
U.S. Appl. No. 17/164,740, Advisory Action dated Jun. 13, 2023.

* cited by examiner

METHOD FOR ATTACHING A LEVELING SYSTEM

CROSS-REFERENCE TO RELATED APPLICATIONS

This application is a divisional of co-pending U.S. patent application Ser. No. 16/140,230, filed on Sep. 24, 2018 by the same inventors, which is a continuation-in-part of co-pending U.S. patent application Ser. No. 15/703,228, filed on Sep. 13, 2017 by the same inventors, which claims the benefit of U.S. Provisional Patent Application Ser. No. 62/394,900, filed on Sep. 15, 2016 by the same inventors, all of which are incorporated herein by reference in their respective entireties.

BACKGROUND OF THE INVENTION

Field of the Invention

This invention relates generally to leveling systems for vehicles, and more particularly to attachable leveling systems configured for jacking a vehicle frame.

Description of the Background Art

Recreational vehicles (RVs) are popular for travel and camping. Increasingly, non-recreational utility vehicles are being converted into RVs. For example, the Mercedes Benz Sprinter 3500 is a cargo van, typically used for commercial applications, which is a popular vehicle for RV conversion. When converting general-use vehicles to an RV, it often becomes necessary to consider a leveling system for the vehicle, because most general-use vehicles do not come equipped with one.

Sometimes stand-alone jacks are placed under a converted RV to lift the RV for leveling purposes. This is disadvantageous, however, because the jacks need to be stored (e.g., in a vehicle compartment) when not in use and some work is required to place and extend the jacks for leveling. One solution to these problems is to drill holes into the frame of the vehicle and attach jack(s) using these newly-drilled holes. Unfortunately, this solution is also disadvantageous, because drilling into "no-drill zones" in the frame can void a manufacturer's warranty and/or create a safety hazard, for example, by weakening the frame.

SUMMARY

The present invention overcomes the problems associated with the prior art by providing a vehicle leveling system adapted to be mounted to a vehicle without permanently modifying the vehicle's frame.

The vehicle leveling system includes a first jack and a frame engaging feature. The first jack is extendable between a stowed position and a deployed position and includes an upper region and a lower region. The first frame engaging feature is coupled to the upper region of the first jack and is adapted to engage a frame of the vehicle without permanently modifying the vehicle's frame.

In a particular embodiment, the first frame engaging feature includes a first frame engaging bracket adapted to urge against a bottom surface of the frame when the first jack is in the deployed position. In a more particular embodiment, the first frame engaging feature includes a first horizontal adjustment feature facilitating horizontal adjustment of a fixed horizontal position of the first frame engaging bracket with respect to the first jack. Even more particularly, the first frame engaging feature further includes a second frame engaging bracket and a second horizontal adjustment feature. The second frame engaging bracket is adapted to urge against the bottom surface of the frame when the first jack is in the deployed position, and the second horizontal adjustment feature facilitates horizontal adjustment of a fixed horizontal position of the second frame engaging bracket with respect to the first jack. In a specific example, the first and/or second horizontal adjustment feature includes a horizontal elongated slot and a bolt, the horizontal elongated slot is formed in the associated frame engaging bracket, and the bolt is disposed in the horizontal elongated slot and is horizontally fixed with respect to the first jack. In another more particular embodiment, the first and/or second frame engaging bracket includes a lip adapted to engage a side wall of the vehicle frame.

In another particular embodiment, the leveling system further comprises a mounting structure coupled to the upper region of the first jack. The mounting structure is adapted to be mounted to a surface of the vehicle adjacent the frame and is further adapted to vertically support the weight of the first jack when the first jack is in the stowed position. In a more particular embodiment, the mounting structure includes a vertical adjustment feature facilitating vertical adjustment of a fixed vertical position of the first frame engaging feature with respect to the mounting structure. In an even more particular embodiment, the mounting structure includes at least one bracket, and the vertical adjustment feature includes a vertical elongated slot and a bolt. The bracket is adapted to be fixably mounted to the surface of the vehicle adjacent the frame. Additionally, the vertical elongated slot is formed in the bracket, and the bolt is disposed in the vertical elongated slot and is vertically fixed with respect to the first jack. In another particular embodiment, the vertical adjustment feature includes a first bracket and a second bracket, where each of the first and second brackets is adapted to be fixably mounted to the surface of the vehicle adjacent the frame. Additionally, the first bracket and the second bracket are each vertically adjustable with respect to the first jack, and the first bracket and the second bracket are independently adjustable. The surface of the vehicle adjacent the frame can be a floor of the vehicle, for example of the passenger cabin. Optionally, the floor can be a portion of a uni-body.

In another embodiment, the leveling system further includes a second jack and a second frame engaging feature. The second jack is extendable between a stowed position and a deployed position and includes an upper region and a lower region. The second frame engaging feature is coupled to the upper region of the second jack and is adapted to engage the frame of the vehicle without permanently modifying the frame. In a more particular embodiment, the vehicle leveling system further includes a cross-member having a first end and a second end, where the first end is coupled to the first jack and the second end is coupled to the second jack.

In yet another particular embodiment, the vehicle leveling system further includes a bracket fixably coupled to the first jack and defining a first aperture and a second aperture. The first aperture is disposed to be coaxially aligned with a first manufacturer-provided aperture in a vehicle frame when the second aperture is coaxially aligned with a second manufacturer-provided aperture in the vehicle frame. In a more particular embodiment, the vehicle leveling system further includes a first bolt and a second bolt. The first bolt is adapted to be simultaneously disposed through the first aperture of the bracket and the first manufacturer-provided aperture in the vehicle frame. Similarly, the second bolt is adapted to be simultaneously disposed through the second aperture of the bracket and the second manufacturer-provided aperture in the vehicle frame. In another more particular embodiment, the vehicle leveling system further includes a second jack extendable between a stowed position and a deployed position. The second jack includes a bracket fixably coupled to the second jack, and the bracket of the second jack defines a first aperture and a second aperture. The first aperture of the bracket of the second jack is disposed to be coaxially aligned with a third manufacturer-provided aperture in the vehicle frame when the second aperture of the bracket of the second jack is coaxially aligned with a fourth manufacturer-provided aperture in the vehicle frame. In an even more particular embodiment, the vehicle leveling system includes a cross-member having a first end coupled to the first jack and a second end coupled to the second jack.

In another embodiment, a vehicle leveling system includes a first jack, a first bracket, a second bracket, a second jack, a third bracket, a fourth bracket, and a cross-member. The first bracket is coupled to the first jack and is adapted to urge against a bottom surface of a vehicle frame when the first jack is in a deployed position. The first bracket includes a horizontal adjustment feature for horizontally adjusting the fixed horizontal position of the first bracket with respect to the first jack. The second bracket is coupled to the first jack and is adapted to mount to a surface of the vehicle adjacent the vehicle frame. The second bracket includes a vertical adjustment feature for vertically adjusting the fixed vertical position of the second bracket with respect to the first jack. The third bracket is coupled to the second jack and is also adapted to urge against a bottom surface of the vehicle frame when the second jack is in a deployed position. The third bracket includes a horizontal adjustment feature for horizontally adjusting the fixed horizontal position of the third bracket with respect to the second jack. The fourth bracket is coupled to the second jack and is adapted to mount to a surface of the vehicle adjacent the vehicle frame. The fourth bracket includes a vertical adjustment feature for vertically adjusting the fixed vertical position of the fourth bracket with respect to the second jack. The cross-member is fixably coupled to the first jack and the second jack.

A method for attaching a jack to a vehicle is also disclosed. The method includes the steps of providing a jack having a first set of support features (e.g., a first set of brackets) and a second set of support features (e.g., a second set of brackets) adjustably mounted thereto, mounting the first set of support features to a surface (e.g., a floor) of the vehicle adjacent a frame of the vehicle, positioning the second set of support features under the frame, lifting the jack such that the second set of support features engages an underside of the frame, and securing the jack in position relative to the frame and to the surface of the vehicle (e.g., by securing the first and the second sets of support features to the jack and securing the first set of support features to the surface of the vehicle).

Another method for attaching a jack to a vehicle includes the steps of providing a jack having a first frame engaging feature and a second frame engaging feature; aligning the jack with the frame such that the first frame engaging feature is aligned with a first manufacturer-provided feature of the frame and the second frame engaging feature is aligned with a second manufacturer-provided feature of the frame, securing the first frame engaging feature to the first manufacturer-provided feature, and securing the second frame engaging feature to the second manufacturer-provided feature. Optionally, this method can be used to attach a second jack to a vehicle in combination with the method described in the prior paragraph.

A system configured to couple a jack to a vehicle without altering a frame of the vehicle is also disclosed. The system includes a first set of support features (e.g., a first set of brackets, etc.) and a second set of support features (e.g., a second set of brackets, etc.). The first set of brackets is configured to be coupled to a jack and to be affixed to a surface of the vehicle adjacent the frame. The second set of brackets is configured to be coupled to the jack and to abut a bottom surface of the frame so as to be able to exert a lifting force on the frame when the jack is actuated.

In a particular embodiment, the system further includes an intermediate structure (e.g., an intermediate bracket, such as a U-bracket, etc.) configured to be affixed to the jack. Additionally, each of the first set of brackets and the second set of brackets is configured to be adjustably attached to the intermediate bracket.

In another particular embodiment, each bracket of the first set of brackets includes an elongated fastening region to facilitate generally vertical adjustment of the bracket of the first set with respect to the jack. Still more particularly, the elongated fastening region comprises a set of slotted holes formed in the bracket of the first set of brackets.

In still another particular embodiment, each bracket of the second set of brackets includes a lip extending upward with respect to a bottom surface of the bracket of the second set. The lip prevents the frame from moving laterally with respect to the jack when the jack is actuated. In a more specific example, each bracket of the second set of brackets is a J-shaped bracket. In another more particular embodiment, each bracket of the second set of brackets includes an elongated fastening region (e.g., a set of slotted holes formed in the bracket, etc.) to facilitate generally horizontal adjustment of the bracket with respect to the jack.

A system for attaching a jack to a vehicle frame having manufacturer-provided features is also described. The system includes an intermediate structure and a set of fasteners. The intermediate structure (e.g., a bracket, a U-bracket, etc.) defines a set of apertures therethrough and is configured to be affixed to a jack. The apertures of the intermediate structure are disposed at locations corresponding to locations of the manufacturer-provided features (e.g., apertures) in the frame. Each fastener (e.g., bolt) in the set of fasteners is configured to be disposed simultaneously through at least one of the apertures in the intermediate bracket and through at least one of the manufacturer-provided apertures, whereby the intermediate bracket will be disposed adjacent the frame of the vehicle when installed. Additionally, when the system in installed on the jack and the frame and the jack is actuated, a lifting force is transferred from the jack to the frame via the intermediate structure and the set of fasteners.

A jack system for providing a vehicle with leveling capability is also described. The system includes a set of front jacks, a first set of front brackets, a second set of front brackets, a set of rear jacks, a set of rear brackets, and a set of rear fasteners. Each bracket of the first set is configured to couple to one of the front jacks and to a surface of the vehicle adjacent its frame. Each bracket of the second set is configured to couple to one of the front jacks and to engage a bottom surface of the vehicle's frame. Additionally, each rear bracket is configured to be fixed to one of the rear jacks and includes a set of apertures that are disposed to coaxially align with a set of manufacturer-provided apertures formed in the frame. The set of rear fasteners is configured to attach the set of rear brackets adjacent to the frame via the set of manufacturer-provided holes. When the system is installed and the jacks are actuated, each bracket of the second set of front brackets exerts an upward force on the frame, and each of the rear brackets exerts an upward force on the frame via the set of rear fasteners and the set of manufacturer-provided apertures.

Another vehicle leveling system is also described. The system includes a first jack and a first frame engaging bracket. The first jack is extendable between a stowed position and a deployed position. The first jack has an upper portion and a lower portion extendable with respect to the upper portion. The first frame engaging bracket is coupled to the upper portion of the first jack and includes a horizontal surface and a vertical surface. The horizontal surface of the first frame engaging bracket is positioned to urge against a bottom surface of a member of the vehicle frame. The vertical surface of the first frame engaging bracket extends upwardly from a side edge of the horizontal surface, is disposed to abut a side surface of a member of the vehicle frame, and defines a first aperture disposed to be aligned with a first manufacturer-provided aperture in the member of the vehicle frame.

In a particular embodiment, the vertical surface of the first frame engaging bracket defines a second aperture disposed to be aligned with a second manufacturer-provided aperture in the member of the vehicle frame when the first aperture of the vertical surface is aligned with the first manufacturer-provided aperture in the member of the vehicle frame. In more particular examples, the first and/or second apertures of the vertical surface of the first frame engaging bracket are vertically elongated slots.

In yet another particular embodiment, the first frame engaging bracket includes a lip extending upwardly from a second side edge, opposite the side edge of the horizontal surface of the first frame engaging bracket. In a particular example, the lip extends upwardly a sufficient distance to abut a second, opposite side of the member of the vehicle frame. The horizontal surface, the vertical surface, and the lip limit the rotation of the member of the vehicle frame within or with respect to the frame engaging bracket.

In another particular embodiment, the vehicle leveling system further includes an adjustment feature for adjusting a fixed position of the first frame engaging bracket with respect to the upper portion jack. In an even more particular embodiment, the adjustment feature includes a vertical adjustment feature for vertically adjusting the fixed position of the first frame engaging bracket with respect to the upper portion of the jack. In an even more particular embodiment, the first jack includes a mounting bracket coupled to the upper portion of the first jack. In addition, the vertical adjustment feature includes a first vertical column of apertures formed in at least one of the first frame engaging bracket and the mounting bracket of the first jack. In an example, the other of the at least one of the first frame engaging bracket and the mounting bracket of the first jack includes a first horizontal row of apertures facilitating horizontal adjustment of the fixed position of the mounting bracket of the first jack with respect to the first frame engaging bracket. In a more specific example, the first vertical column of apertures includes a vertical column of horizontally elongated slots and the first horizontal row of apertures includes a horizontal row of horizontally elongated slots.

In another particular embodiment, the adjustment feature includes a horizontal adjustment feature for adjusting the fixed horizontal position of the first frame engaging bracket with respect to the jack. In a more specific example, the first jack includes a mounting bracket coupled to the upper portion of the first jack and the horizontal adjustment feature includes a first horizontal row of apertures formed in at least one of the first frame engaging bracket and the mounting bracket of the first jack. In an more specific example, the first horizontal row of apertures includes a plurality of horizontally elongated slots.

In a particular embodiment, the vehicle leveling system further includes an adjustment feature for vertically adjusting the fixed position of the first frame engaging bracket with respect to the member of the vehicle frame.

In another particular embodiment, the vehicle leveling system further includes a second jack and a second frame engaging member. The second jack is extendable between a stowed position and a deployed position. The second jack has an upper portion and a lower portion extendable with respect to the upper portion. The second frame engaging bracket is coupled to the upper portion of the second jack. The second frame engaging bracket includes a horizontal surface and a vertical surface. The horizontal surface of the second frame engaging bracket is positioned to urge against a bottom surface of a second member of the vehicle frame. The vertical surface of the second frame engaging bracket extends upwardly from a side edge of the horizontal surface of the second frame engaging bracket, is disposed to abut a side edge of a second member of the vehicle frame, and defines a first aperture disposed to be aligned with a second manufacturer-provided aperture in the second member of the vehicle frame.

An example method is also described. The method includes providing a first jack, a first mounting structure, and a first fastener. The first jack has an upper portion and a lower portion extendable with respect to the upper portion. The first mounting structure has a horizontal surface and a vertical surface. The vertical surface extends upwardly from the horizontal surface and defines an opening. The method also includes coupling the first mounting structure to the first jack, disposing the first fastener through a first manufacturer-provided opening of the vehicle frame and the opening in the vertical surface of the first mounting structure, urging the horizontal surface of the first mounting structure against a bottom surface of a member of the vehicle frame, and securing the first fastener to the first mounting structure and the member of vehicle frame, while the horizontal surface of the first mounting structure is urged against the bottom surface of the second member of the vehicle frame.

In a particular example, the method further includes providing a second jack, a second mounting structure, and a second fastener. The second jack has an upper region and a lower portion extendable with respect to the upper portion. The second mounting structure has a horizontal surface and a vertical surface. The vertical surface of the second mounting structure extends upwardly from an edge of the horizontal surface of the second mounting structure and defines an opening. The method also includes coupling the second mounting structure to the second jack, and disposing the second fastener through a second manufacturer-provided opening of the second member of the vehicle frame and the opening in the vertical surface of the second mounting structure. Furthermore, the method includes urging the horizontal surface of the second mounting structure against a bottom surface of a second member of the vehicle frame, and securing the second fastener to the second mounting structure and the second member of the vehicle frame, while the horizontal surface of the second mounting structure is urged against the bottom surface of the second member of the vehicle frame.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing leveling jacks and a method of installing such leveling jacks onto a vehicle, without drilling new holes into the frame of the vehicle or otherwise permanently modifying the vehicle frame, particularly in "no-drill" zones. In the following description, numerous specific details are set forth (e.g., bracket types, vehicle type/layout, etc.) in order to provide a thorough understanding of the invention. Those skilled in the art will recognize, however, that the invention may be practiced apart from these specific details. In other instances, details of well-known leveling practices (e.g., jack placement, synchronization, power, etc.) and components (e.g., hydraulic systems, etc.) have been omitted, so as not to unnecessarily obscure the present invention.

Figure 1:
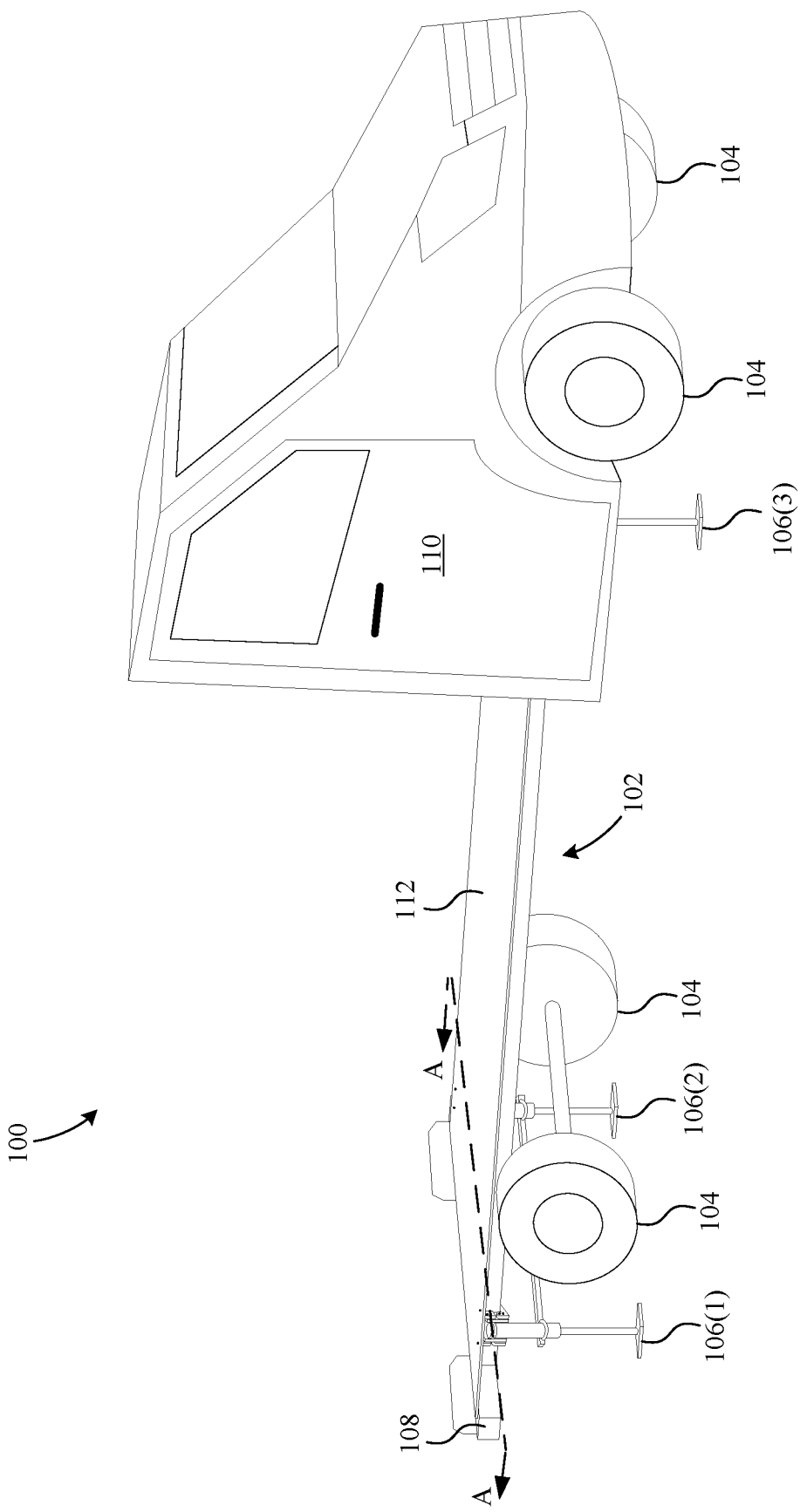
FIG. 1 is a perspective view of an exemplary utility vehicle including an attachable leveling system according to one embodiment the present invention.

FIG. 1 is a perspective view of a utility vehicle 100 of the type that is commonly converted into a recreational vehicle (RV). Utility vehicle 100 includes a frame 102 (e.g., frame rails, cross members, etc.), a set of wheels 104, a plurality of leveling jacks 106, and a frame attachment 108. In the present embodiment, utility vehicle 100 includes four leveling jacks 106(1-4), where the fourth jack 106(4) is hidden from view by front passenger-side wheel 104. Frame attachment 108 represents a bumper, a frame and/or cargo extender, etc. that is attached to frame 102.

Utility vehicle 100 also includes a passenger cabin 110 and a floor 112, which are coupled to frame 102. In some embodiments, cabin 110 and/or floor 112 might be separate components mounted onto frame 102 in a "body-on-frame" configuration, whereas in the case of "uni-body" structures, cabin 110 and/or floor 112 can be formed integrally with the members (e.g., frame rails, cross-members, etc.) of frame 102. Frame 102 can have both "no-drill" and "drill-permitted" zones, where drilling through a "no-drill" zone would void a manufacturer's warranty and/or create a safety issue. Commonly "no-drill" zones include frame rails and cross-members of frame 102, whereas floor 112 and/or passenger cabin 110 typically include "drill-permitted" zones (e.g., those areas not located over frame rails, cross members, etc.) that can be drilled through without voiding a warranty or creating a safety hazard.

In FIG. 1, floor 112 is shown representationally as a "drill-permitted zone" and might be, for example, the floor of an RV living space, the floor of a cargo van, a truck bed, etc. coupled to frame 102. In the following examples, floor 112 will be described as part of a uni-body frame 102. However, the invention applies equally if floor 112 is a bolt-on component in the body-on-frame configuration. Thus, utility vehicle 100 represents any vehicle that would benefit from an attachable leveling system, such as a cargo van, a pickup truck, a semi truck, a tractor-trailer combination, a trailer, etc. where modifying "no-drill" zones is a concern.

Oftentimes, it is necessary for the structures (e.g., a recreational cabin, cargo cabin, etc.) coupled to frame 102 of vehicle 100 to be leveled for proper use when parked. While wheels 104 are level enough for driving purposes, the attached structures may not sit level when parked on uneven terrain. To provide further leveling, leveling jacks 106(1-4) (only 3 shown) are installed onto frame 102 and can be independently actuated to raise or lower associated portions of utility vehicle 100. As will be discussed below, leveling jacks 106 couple to vehicle 100 in ways that do not require new holes to be drilled in a "no-drill" zone of frame 102 and that do not create safety concerns.

Figure 2:
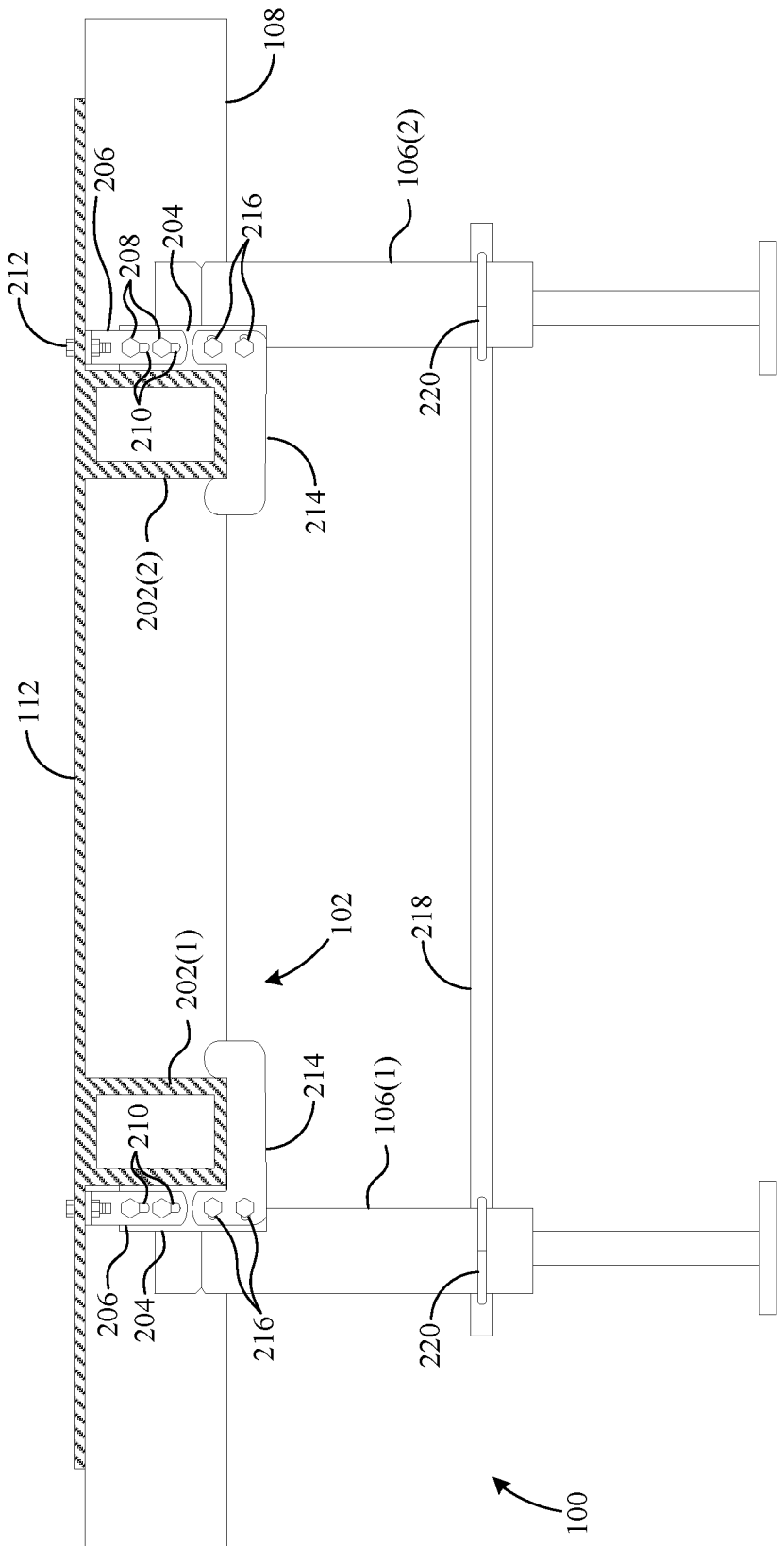
FIG. 2 is a cross-sectional view of the utility vehicle of FIG. 1 taken along line A-A.

FIG. 2 shows the rear end of utility vehicle 100 sectioned along line A-A of FIG. 1. As shown, leveling jacks 106(1-2) are attached to floor 112 adjacent respective frame rails 202(1-2) of frame 102. Here, floor 112 is integrated with frame 102 in a uni-body configuration, but in other embodiments, floor 112 can be associated with any body-on-frame component that attaches (e.g., with bolts, etc.) to one or more of frame rail(s) 202(1-2).

In the example embodiment, each of jacks 106(1-2) is fixed (e.g. by welding, etc.) to a respective U-bracket 204. A pair of L-brackets 206 is adjustably attached to each U-bracket 204 by a set of fasteners (e.g., bolts, etc.) 208 disposed through a plurality of vertically elongated (slotted) holes 210, which function as a vertical adjustment feature. Slotted holes 210 allow jacks 106 to be fixed to a slanted portion of vehicle 100 (e.g., a slanted portion of cabin 110 or floor 112, etc.) as will be discussed below. L-brackets 204 are mounting structures which, in this example, are mounted to floor 112 via fasteners 212 (e.g., bolts, etc.). Unlike frame rails 202(1-2) which are "no-drill" zones, drilling through floor 112 adjacent the frame rails 202(1-2) is permitted and, therefore, will not void a manufacturer's warranty or create a safety concern.

Each U-bracket 204 also has a pair of J-brackets 214 coupled thereto, which function as frame engaging features. Each of J-brackets 214 is adjustably attached a respective one of U-brackets 204 via a respective set of fasteners (bolts) 216. The J-brackets 214 associated with a particular leveling jack 106 are positioned beneath an associated frame rail 202 and, therefore, function as frame engaging features that engage the lower surface of the associated frame rail 202. Accordingly, J-brackets 214 are designed to withstand a jacking force sufficient to lift vehicle 100. When a leveling jack 106 is extended to meet the ground, an upward force is transferred from the jack 106 to an associated frame rail 202 via the jack's U-bracket 204 and J-brackets 214, thereby lifting frame 102 via the frame rail 202. Because J-brackets 214 are positioned snugly against frame-rails 202 during installation, very minimal (if any) jacking force is exerted directly on floor 112.

FIG. 2 also shows that a cross-member 218 can be attached between adjacent jacks 106, which helps brace and stabilize the jacks 106 when lifting frame 102. Cross-member 218 is coupled to each of jacks 106 by a U-bolt 220. Those skilled in the art will recognize that this particular element (as well as other described elements, even if not explicitly stated) is not an essential element of the present invention. For example, the present invention may be practiced without cross-member 218. In other embodiments, cross-member 218 can be mounted against/coupled to other structures of utility vehicle 100, such as a transmission cross-member, an axle, etc. to provide stability.

Figure 3:
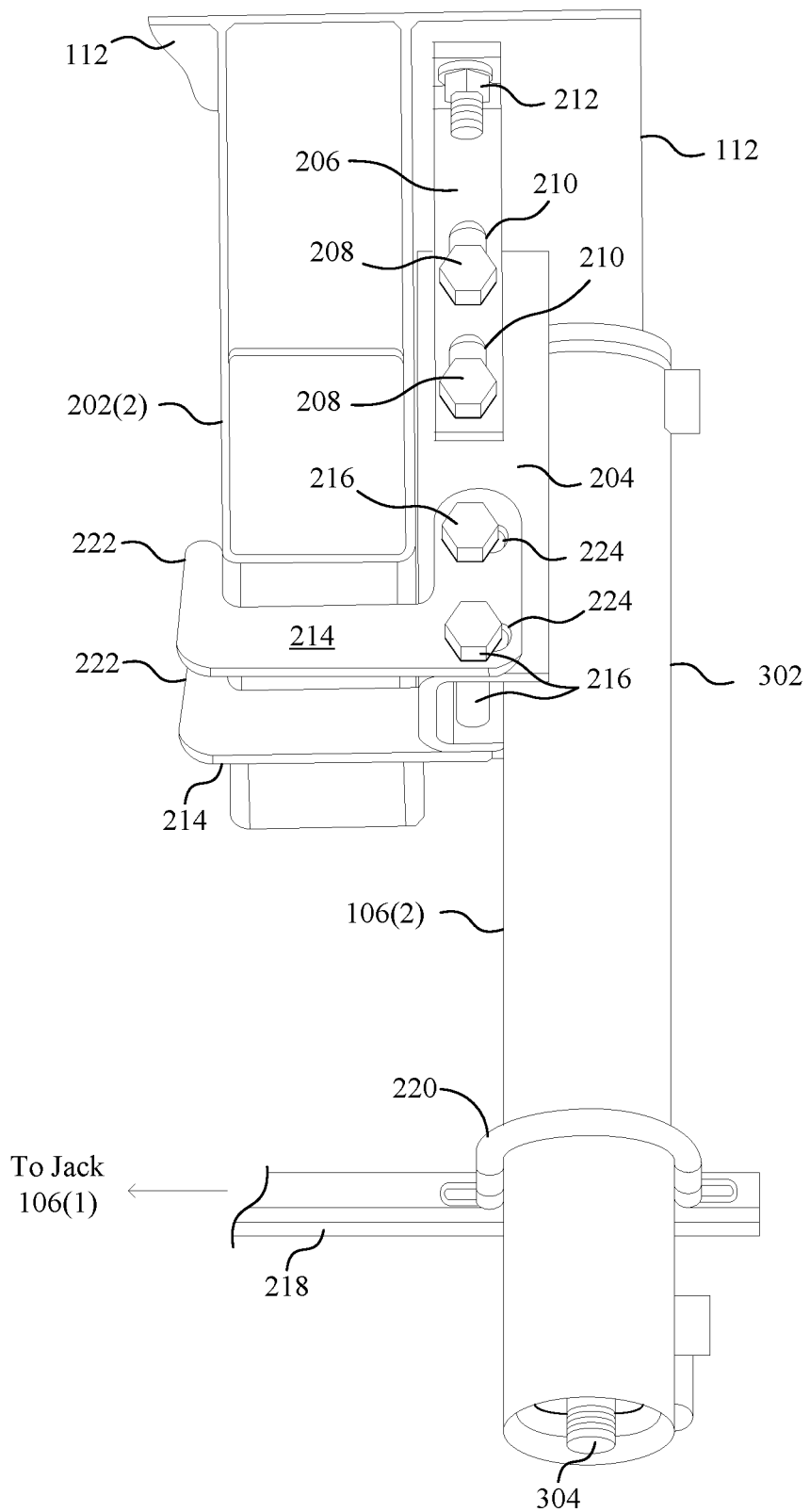
FIG. 3 is a perspective view of one of the installed leveling jacks of FIG. 2.

FIG. 3 is a perspective view of jack 106(2) attached to floor 112 adjacent frame rail 202(2). Only a portion of frame rail 202(2) and floor 112 are shown for simplicity, and jack 106(2) is tipped backward (into the page) to show more detail. As shown, the cylinder 302 of jack 106(2) resides at least partially within the "U" of U-bracket 204. Additionally, each J-bracket 214 includes a lip 222, which is adapted to engage the far side of frame rail 202(2) and prevents J-brackets 214 from slipping off of frame-rail 202(2) when jack 106 is actuated and/or due to motion of vehicle 100 during travel. Lips 222 also prevent jack from rotating outward from frame rail 202(2) and possibly damaging floor 112 near bolts 212.

FIG. 3 also shows how L-brackets 206 and J-brackets 214 are adjustably mounted to U-bracket 204. Both L-brackets 206 (only one shown) are adjustably mounted to U-bracket 204 by a set of bolts 208 (two in this embodiment), which pass through respective vertical slots 210 formed in each L-bracket 206 and behind jack cylinder 302. Slots 210 enable proper vertical positioning of J-brackets 214 to the underside of frame rail 202(2), even if floor 112 is slanted with respect to the bottom surface of frame rail 202(2). Similarly, both J-brackets 214 are adjustably mounted to U-bolt 204 by a set of bolts 216 (two in this embodiment), which pass through respective horizontal slots 224 formed in each J-bracket 214 and behind jack cylinder 302. Slots 224 facilitate proper horizontal (lateral) positioning of J-brackets 214 to the underside of frame rail 202(2). Slots 224 thus provide a tolerance to compensate for coatings (e.g., paint, rust inhibitor, etc.) applied to frame rail 202(2), the mounting locations of L-brackets 206, etc. Accordingly, slots 210 and 224 function as vertical and horizontal adjustment features, respectively, for mounting jack 106 to vehicle 100.

It should also be noted that jack 106 does not include a ram extension or ground pad in the embodiment shown. As will be apparent, such components can be attached to the threaded end 304 of the jack ram. Additionally, jack 106 can be any jack that is suitable to the application, including one that is driven hydraulically, electronically, and/or manually.

Figure 4:
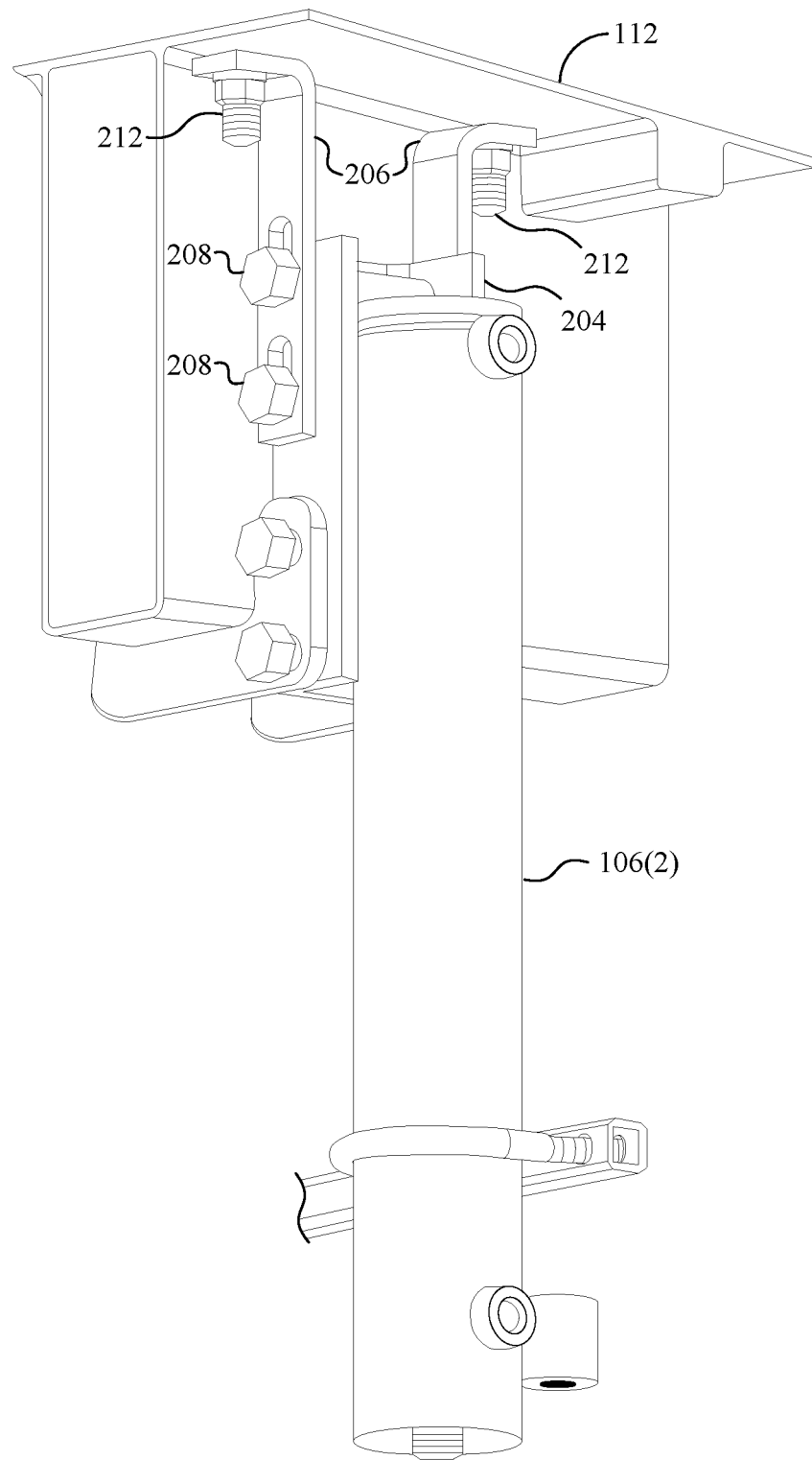
FIG. 4 is another perspective view of the installed leveling jack of FIG. 3.

FIG. 4 is a perspective view showing jack 106(2) from another angle. FIG. 4 shows how U-bracket 204 is attached to floor 112 using two L-brackets 206 and respective bolts 212. Additionally, FIG. 4 shows how each of bolts 208 passes through and secures both of L-brackets 206 to U-bracket 204.

Figure 5:
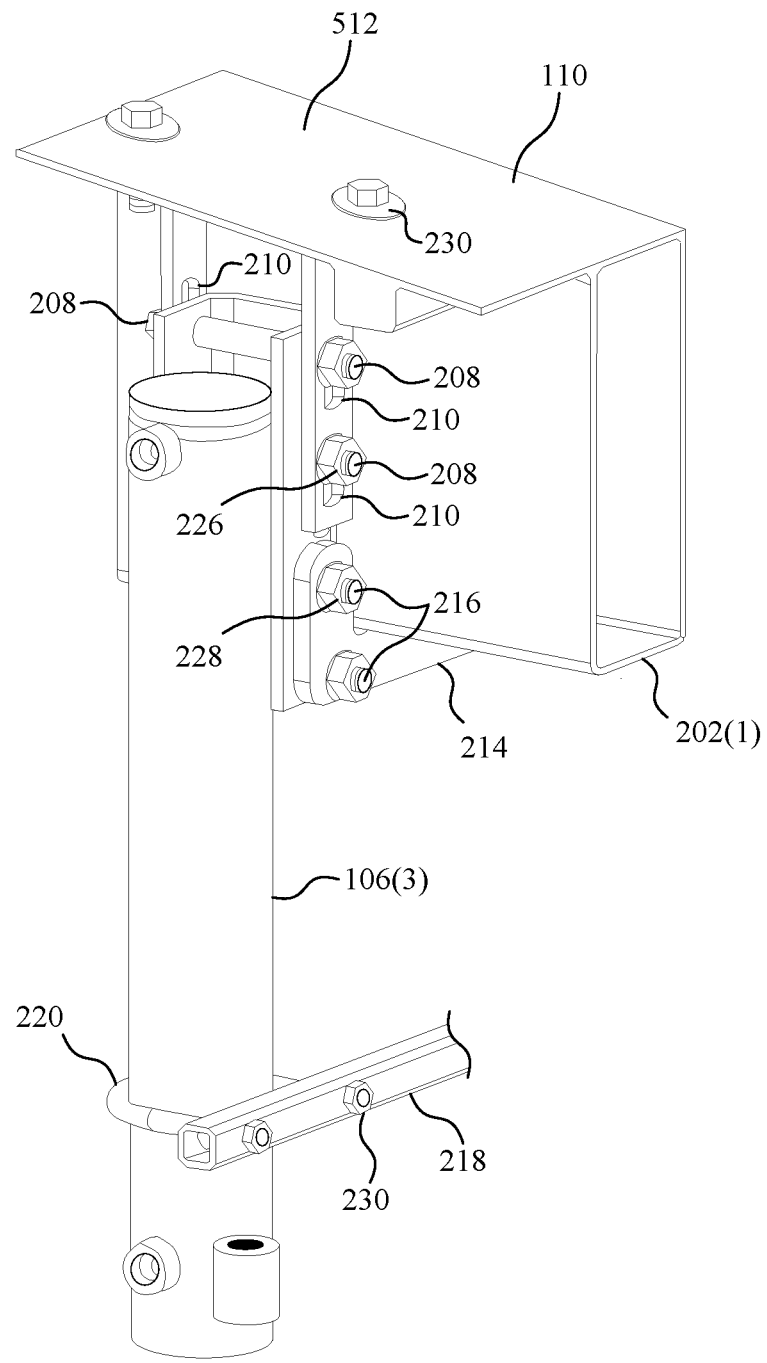
FIG. 5 is a perspective view of one of the leveling jacks of FIG. 1 installed on an angled surface of a utility vehicle.

FIG. 5 shows how a jack 106(3) of the invention can be attached to a slanted floor 512 of the passenger cabin 110 of utility vehicle 100 via the adjustable L-brackets 206. (Only a portion of floor 512 and frame rail 202(1) are shown for simplicity.) Like floor 112, floor 512 and frame rails 202(1-2) of frame 102 are configured as a uni-body. Alternatively, the slanted floor 512 can be part of a body-on-frame passenger cabin.

As shown, the floor 512 has a slight pitch from front to back with respect to the bottom surface of frame rail 202(1). On the near (right) side of jack 106(3), the slotted holes 210 are positioned lower on bolts 208. However, on the far (left) side of jack 106, the slotted holes 210 are positioned higher on bolts 208. This difference in positioning illustrates that, although jack 106(3) is fixed to a slanted surface, jack 106(3) can still be positioned perpendicularly with respect to the ground, and the J-brackets 214 can be positioned tight to the bottom of frame rail 202(1). FIG. 5 also illustrates that the sets of bolts 208 and 216 are secured by respective sets of nuts 226 and 228. Like jacks 106(1-2), a cross-member 218 can optionally be attached between the front set of jacks 106(3-4) using U-bolts 220 and associated nuts 230 for additional stability. In the embodiment of FIG. 1, jack 106(4) near the driver-side front wheel is attached to vehicle 100 substantially similarly as jack 106(3).

Figure 6:
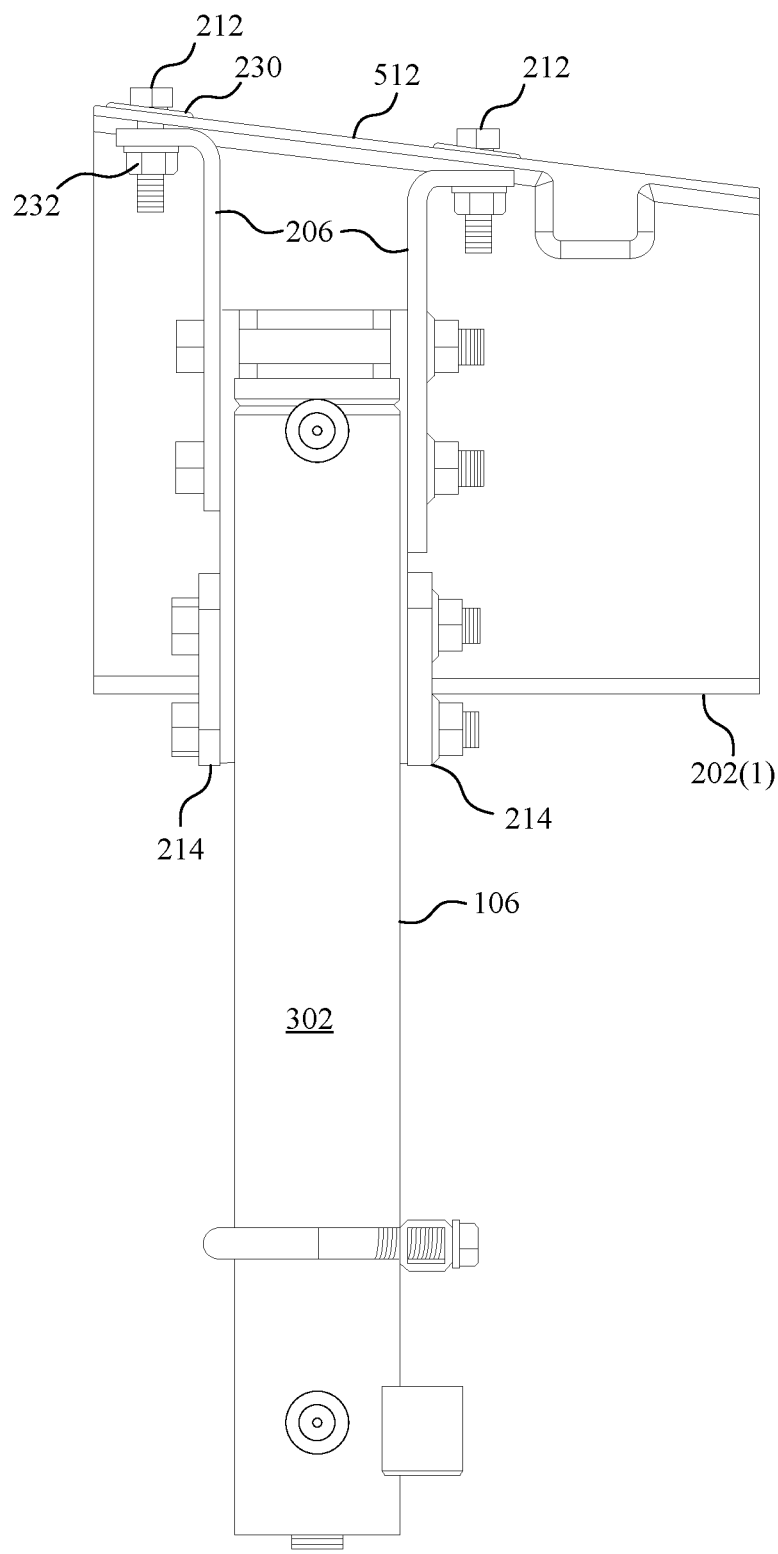
FIG. 6 is a side view of the leveling jack of FIG. 5 installed on the angled surface.

FIG. 6 is a side view showing jack 106(3) of FIG. 5. FIG. 6 better shows the slant of floor 512 in comparison to the vertical orientation of jack 106(3) and the horizontal bottom surface of frame rail 202(1). Like jacks 106(1-2), when jack 106(3) is in a stowed position, the weight of jack 106(3) is carried by L-brackets 206, which are secured to cabin floor 512 via bolts 212 and nuts 232. Washers 230 can be used between the bolts 212 and the floor 512 (or floor 112) to distribute the weight of the jack 106 if desirable. Like floor 112, drilling through floor 512 is permitted by the manufacturer in areas adjacent frame rail 202(1) and, therefore, doing so does not constitute drilling through a "no-drill" zone in frame 102, which could void a manufacturer's warranty and/or create a safety concern.

A method for installing each of jacks 106(1-4) will now be described. First, the jack 106 is installed to the floor (e.g., the floor 512 of the passenger cabin, etc.) of the vehicle 100 by drilling holes through the floor and, optionally, painting over the holes to prevent premature breakdown (e.g., rusting) of exposed metal. Then, the jack 106 is loosely secured to the floor by positioning fasteners 212 through the floor and L-brackets 206. Jack 106 is positioned so that the J-brackets 214, which have been attached to U-bracket 204, are positioned under the desired portion of the frame (e.g., under an associated frame rail 202) and the cylinder 302 of jack 106 is straight in all directions (e.g., front-to-back, left-to-right, etc.). Additionally, J-brackets 214 can be horizontally (laterally) adjusted (via slots 224) so that lip 222 engages the far side of the frame rail 202. Then, jack 106 is lifted (e.g., with a separate floor jack, with jack 106 itself, etc.) so as to lift the vehicle 100 (or at least apply some lifting force to the vehicle 100) via the J-brackets 214 and frame 102. The fasteners 210, 216, and 212 are then tightened to desired torque specification(s). Optionally, the fasteners 212 can be tightened after the fasteners 210 and 216. Once jack is secured in a fixed position with respect to frame, vehicle 100 can be lowered. If jack 106 is not in the correct position, the above procedure can be repeated. The above procedure is performed for all jacks 106 being attached to vehicle 100.

Figure 7:
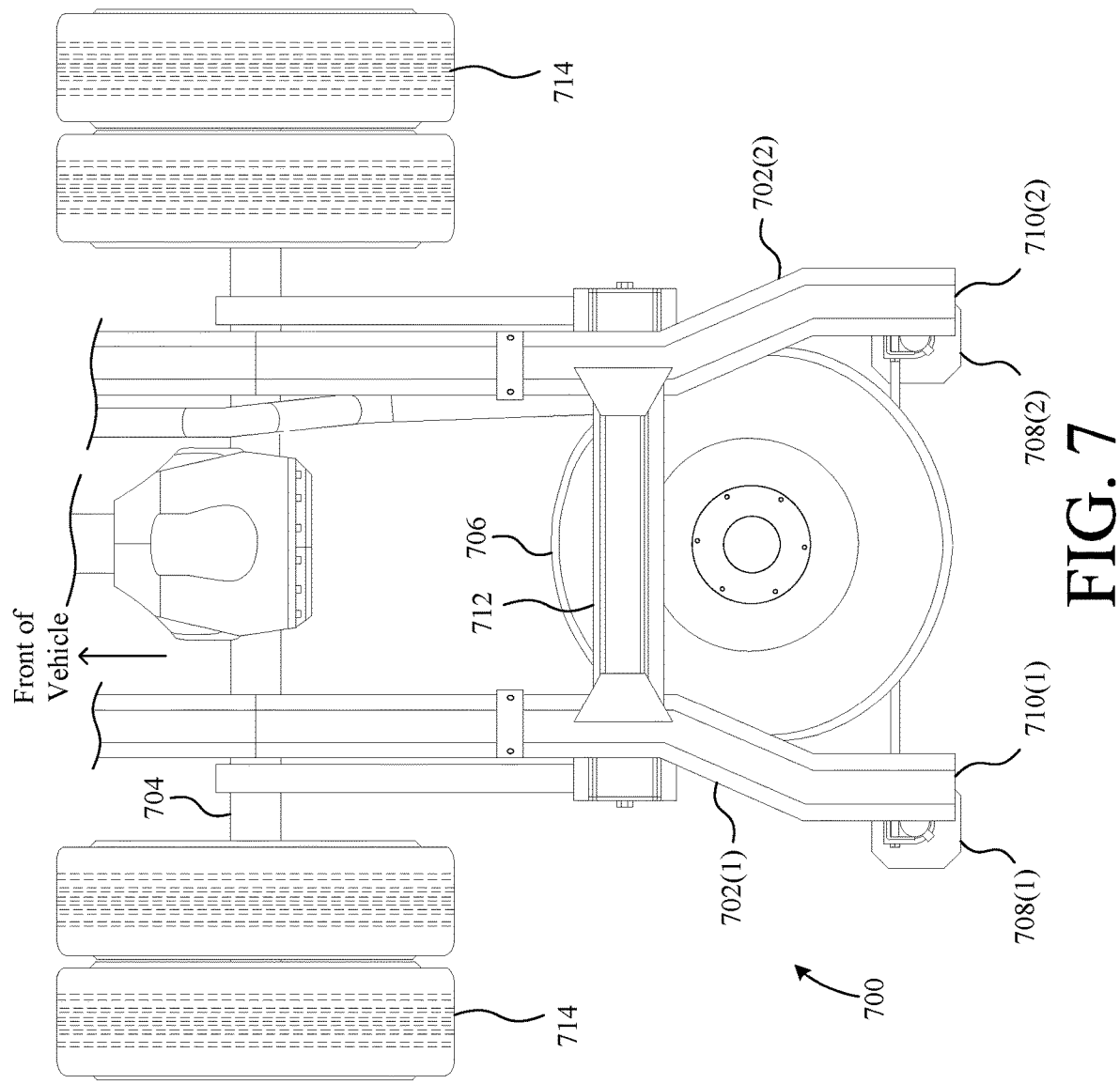
FIG. 7 is a top view of a set of leveling jacks installed on a frame of a utility vehicle according to another embodiment of the present invention.

FIG. 7 is a top view of a rear portion of a frame, including two frame rails 702(1-2) and a cross-member 712, of an alternative utility vehicle 700. Vehicle 700 is also shown to include a rear axle 704, a spare tire 706, and a plurality of wheels 714 coupled to rear axle 704. A plurality of jacks 708(1-2), in accordance with another embodiment of the invention, are attached to the frame near the ends 710(1-2) of respective frame rails 702(1-2). As shown, jacks 708 (1-2) are located behind the rear axle 704, whereas the transmission and engine would be located forward of the rear axle 704, toward the front of vehicle 700. Additionally, jack 708(1) is placed near the outer side of frame rail 702(1), whereas jack 708(2) is placed near the inner side of frame rail 702(2). However, jacks 708(1-2) can be placed on either side of frame rails 702(1-2) as desired depending on the particular application (e.g., to avoid interfering with other components installed near the frame rails 702, etc.).

Figure 8A:
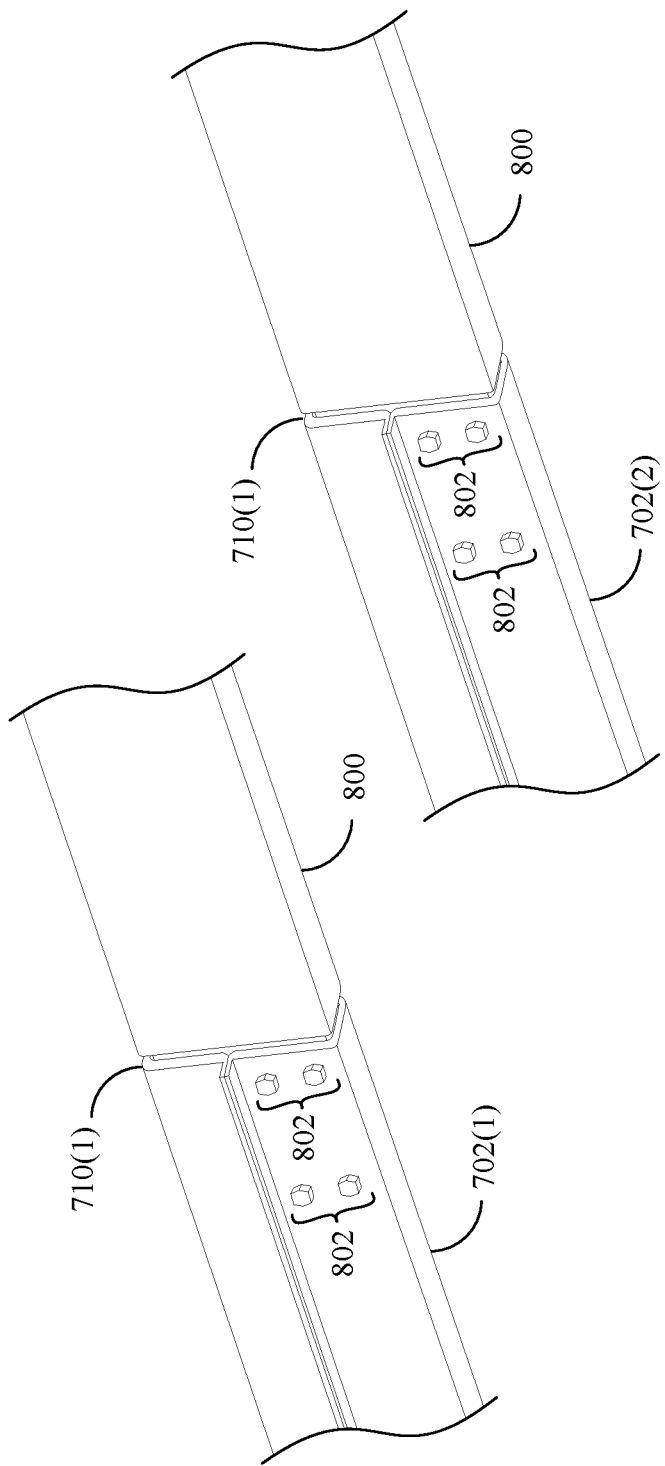
FIG. 8A is a perspective view of a frame extension attached to the frame of the utility vehicle of FIG. 7.

FIG. 8A shows a perspective view of the ends 710(1-2) of frame rails 702(1-2) having a frame attachment 800 mounted thereto. Frame rails 702(1-2) receive complementary portions (not shown) of frame attachment 800 therein. Frame rails 702(1-2) and frame attachment 800 are affixed together using a set of bolts 802 through the frame rails 702(1-2) and their associated portions of frame attachment 800. Frame attachment 800 can be a bumper, a frame extension, etc.

Figure 8B:
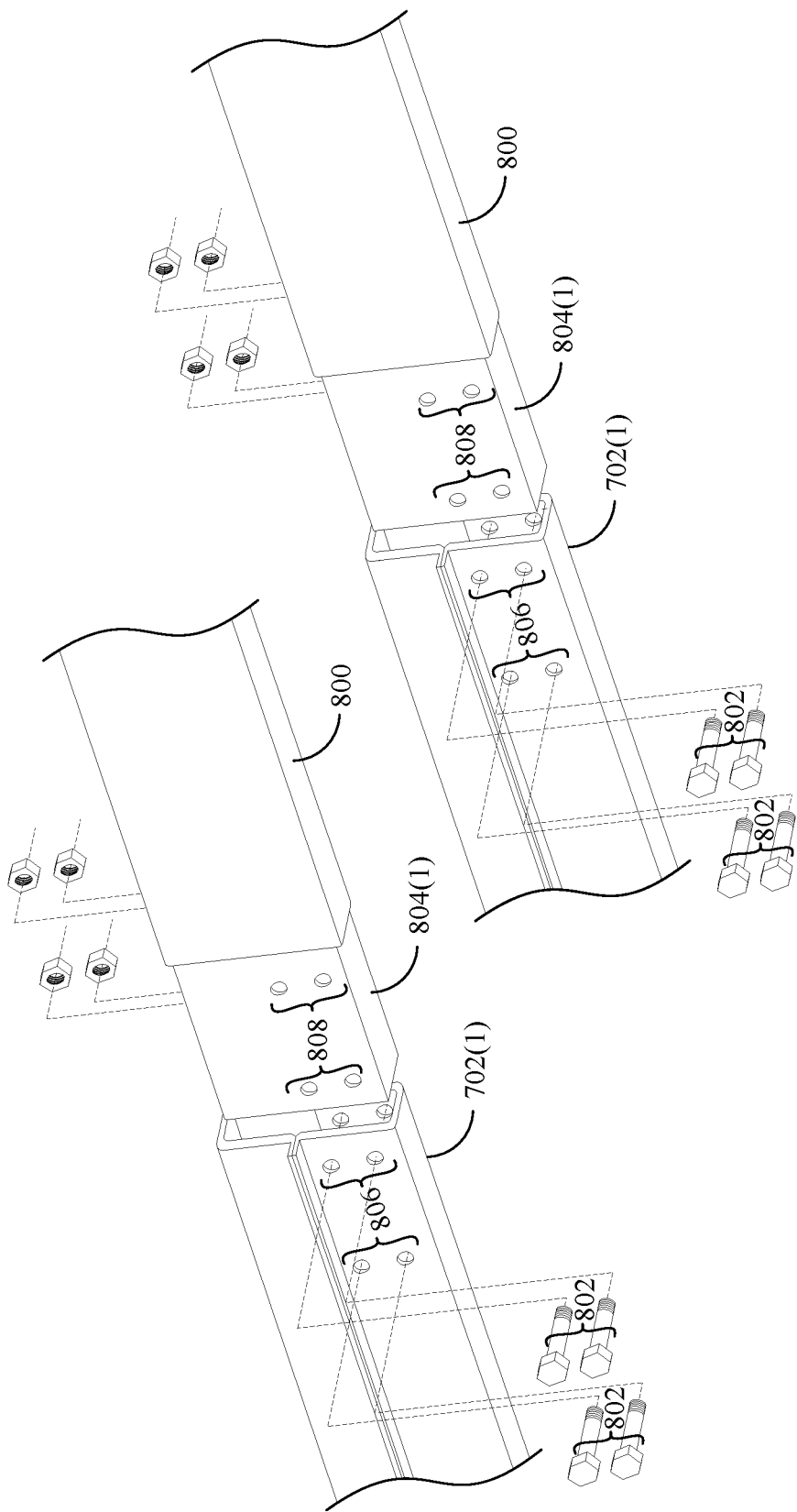
FIG. 8B is a perspective view of the frame extension of FIG. 8A detached from the frame.

FIG. 8B is an exploded perspective view showing the complementary portions 804(1-2) of frame attachment 800 removed from frame rails 702(1-2). As shown, each of frame rails 702(1-2) includes a set of factory apertures 806 (e.g., through-holes made by the manufacturer) formed therein to facilitate the attachment of frame attachment 800. Similarly, each of the complementary portions 804(1-2) of frame attachment 800 also include factory apertures 808. Bolts 802 pass through the respective factory apertures 806 and 808 to attach the frame attachment 800 to frame rails 702(1-2).

Figure 8C:
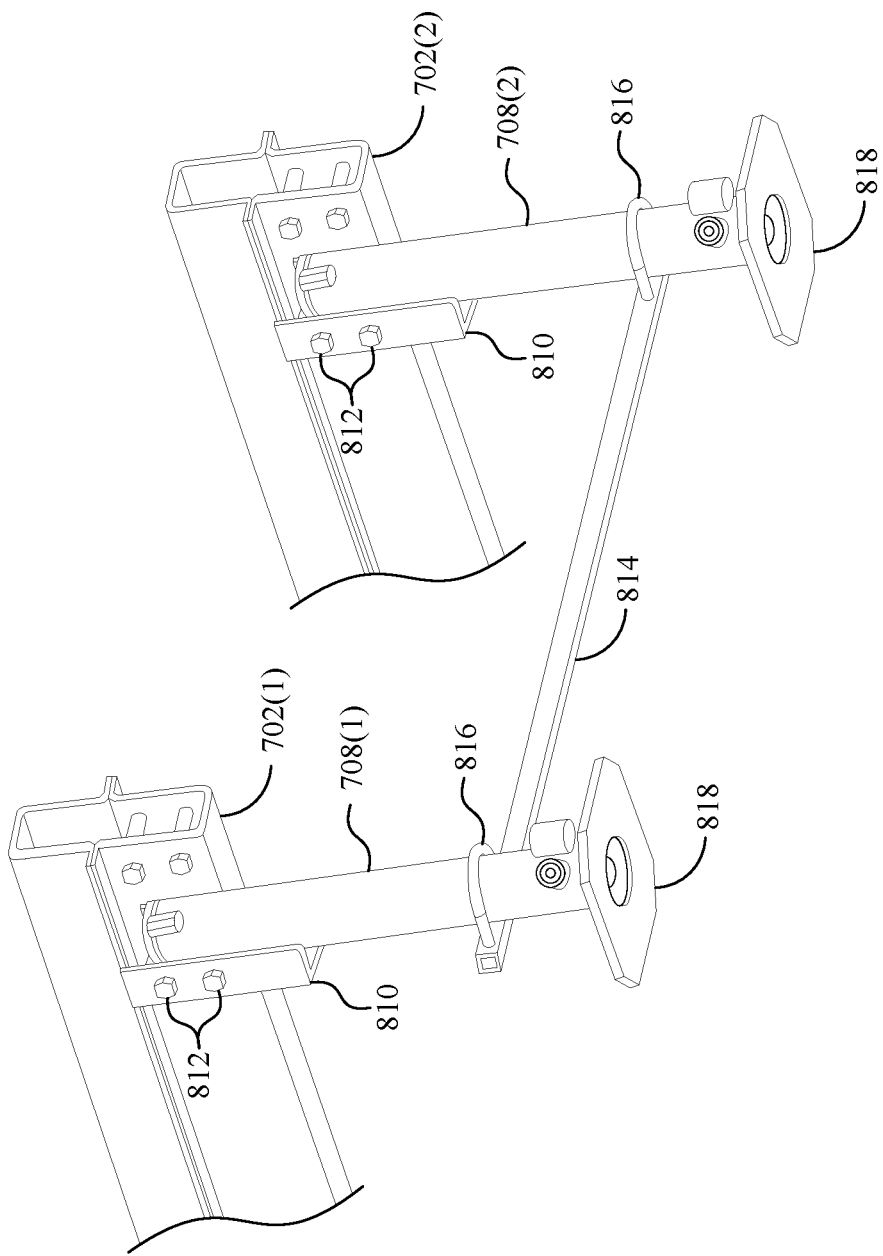
FIG. 8C is a perspective view of the jacks of FIG. 7 installed on the frame without a frame extension.

FIG. 8C shows frame rails 702(1-2) with jacks 708(1-2) installed via several of the factory apertures 806 (FIG. 8B). Each of jacks 708(1-2) is bolted to a respective one of frame rails 702(1-2) by passing bolts 812 through the associated set of factory apertures 806. Bolts 812 replace the corresponding bolts 802 (FIG. 8A) and are sized to pass through both U-bracket 810 and the associated frame rail 702. Optionally, U-brackets 810 can include additional apertures to be interchangeable with U-bracket 204. Each of jacks 708(1-2) is also coupled to a cross-member 814 via a U-bolt 816 for stabilization while lifting vehicle 700. Additionally, each of jacks 708(1-2) includes a foot pad 818 for dispersing the force applied to the ground when jacks 708(1-2) are actuated.

Because jacks 708(1-2) are attached to frame rails 702 (1-2) using existing apertures 806 in the frame rails 702 formed by the manufacturer, no new apertures need to be created in frame rails 702(1-2). Accordingly, attaching the jacks 708(1-2) does not require permanent frame modifications that would void the manufacturer's warranty and/or create safety concerns (e.g., by weakening the vehicle frame, etc.).

Figure 8D:
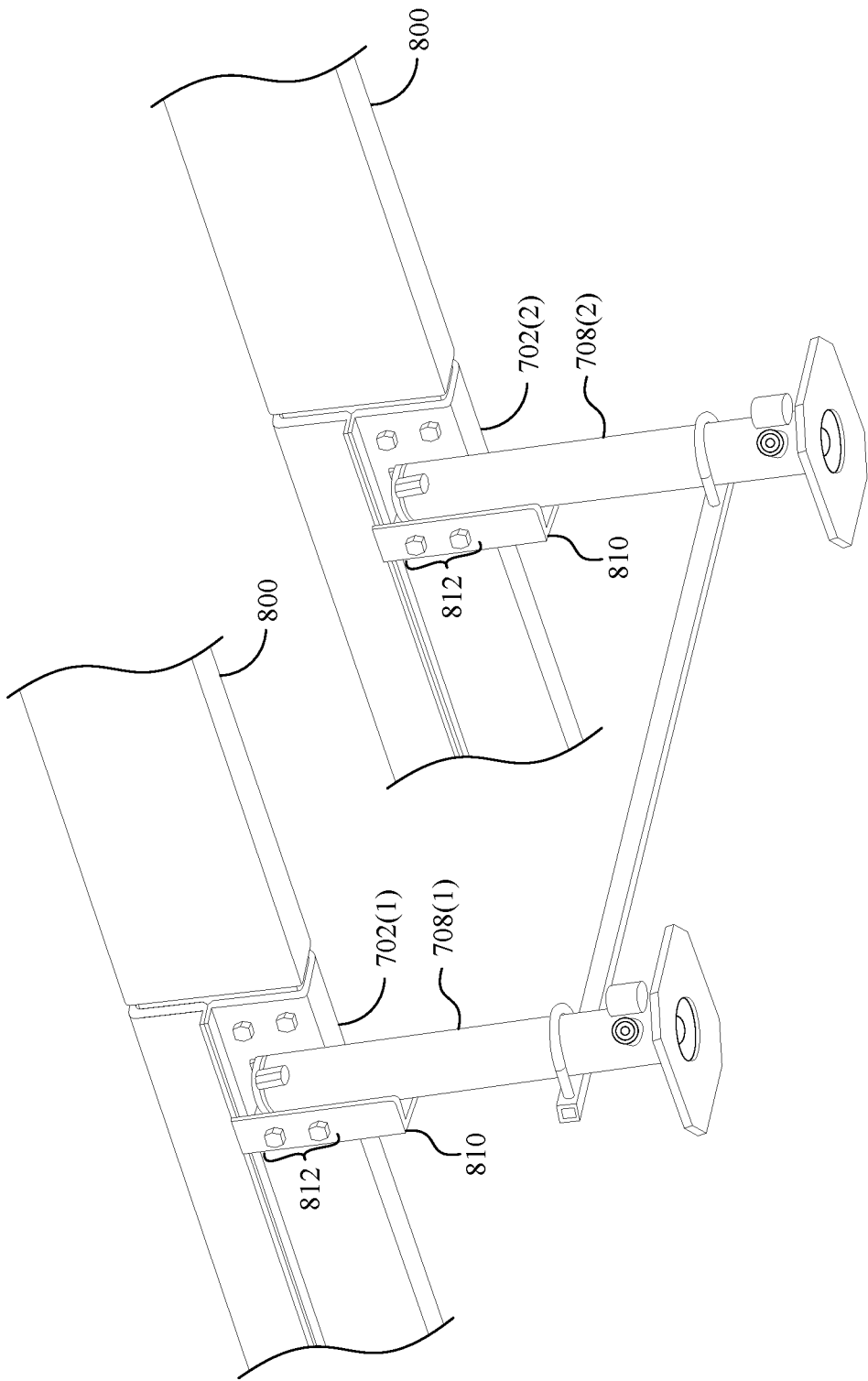
FIG. 8D is a perspective view of the jacks of FIG. 7 installed on the frame along with the frame extension of FIGS. 8A-8B.

FIG. 8D shows frame rails 702(1-2) with both jacks 708(1-2) and frame attachment 800 installed. In this configuration, bolts 812 replace bolts 802 (FIG. 8A) and are sized to couple U-brackets 810 to the respective frame rails 702(1-2). Like above, attaching the jacks 708(1-2) does not require frame modifications that would void the manufacturer's warranty and/or create a safety concern (e.g., by weakening the vehicle frame).

Figure 8E:
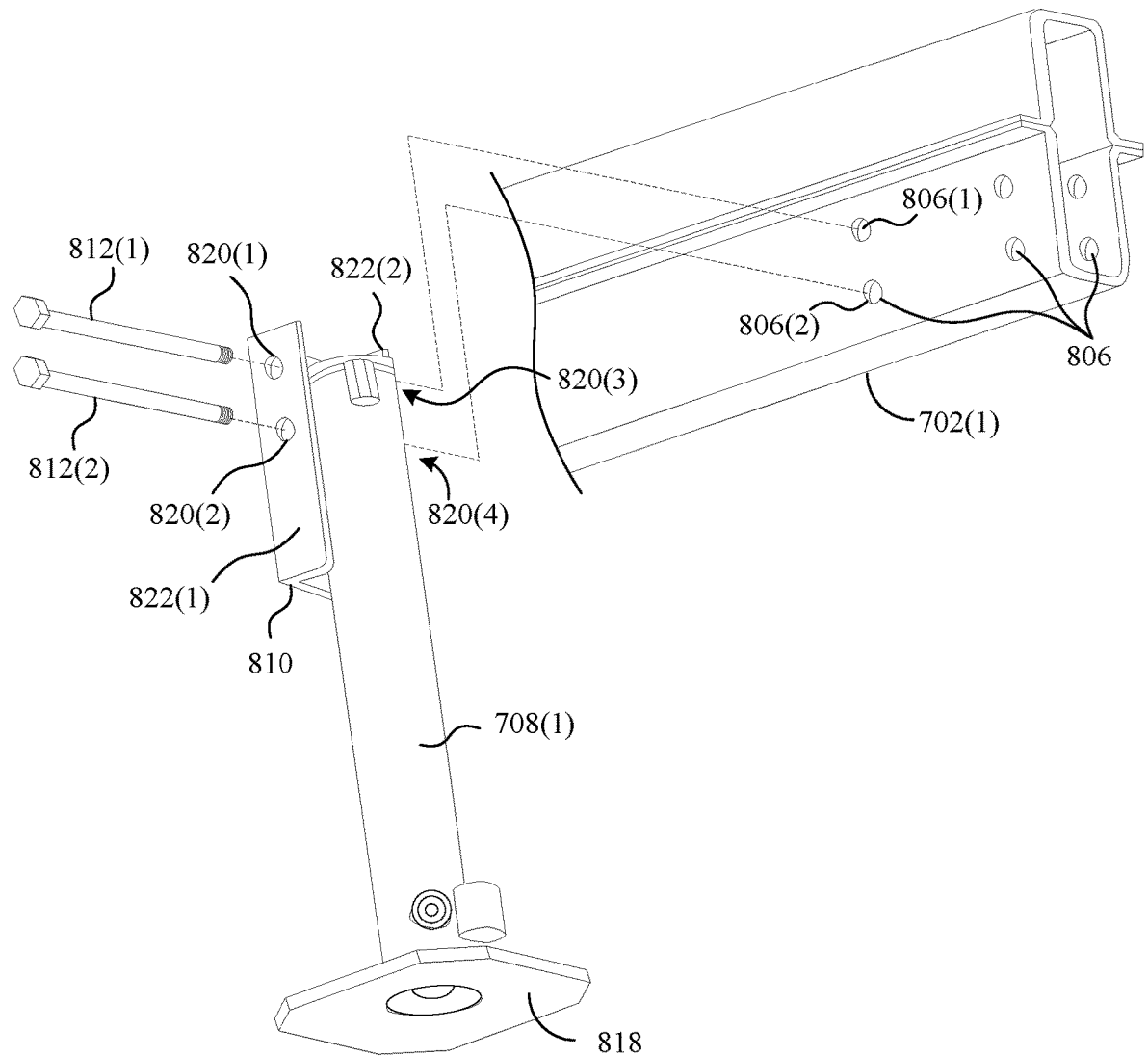
FIG. 8E is a perspective view showing how a jack of FIG. 7 is installed on the frame in greater detail.

FIG. 8E shows how jack 708(1) mounts to frame rail 702(1) via factory apertures 806 in greater detail. In particular, jack 708(1) is fixed to U-bracket 810 (e.g. by welding). A plurality of apertures 820(1-2) are formed through a first arm 822(1) of U-bracket 810, whereas a complementary plurality of apertures 820(3-4) (not shown) are formed through second arm 822(2) of U-bracket 810 in coaxial alignment with apertures 820(1-2). Additionally, when apertures 820(1) and 820(3) are coaxially aligned with a first factory aperture 806(1), then apertures 820(2) and 820(4) can be coaxially aligned with a second factory aperture 806(2). Thereafter, a first bolt 812(1) is passed through apertures 820(1), 820(3), factory aperture 806(1), and a corresponding factory aperture 806 (not shown) that is formed through the far side of frame rail 702 in coaxial alignment with aperture 806(1). Similarly, a second bolt 812(2) is passed through apertures 820(2), 820(4), factory aperture 806(2), and a corresponding factory aperture 806 (not shown) that is formed through the far side of frame rail 702 in coaxial alignment with aperture 806(2). Thereafter, bolts 812(1-2) are secured by nuts on the threaded ends thereof. Jack 708(2) can be mounted to frame rail 702(2) in substantially the same way, after which cross-member 818 can be installed between jacks 708(1-2).

Thus, U-bracket 810, apertures 820, and bolts 812 function as frame engaging features in this embodiment, which engage complementary manufacturer-provided features (e.g., factory apertures 806) on the frame.

Figure 9A:
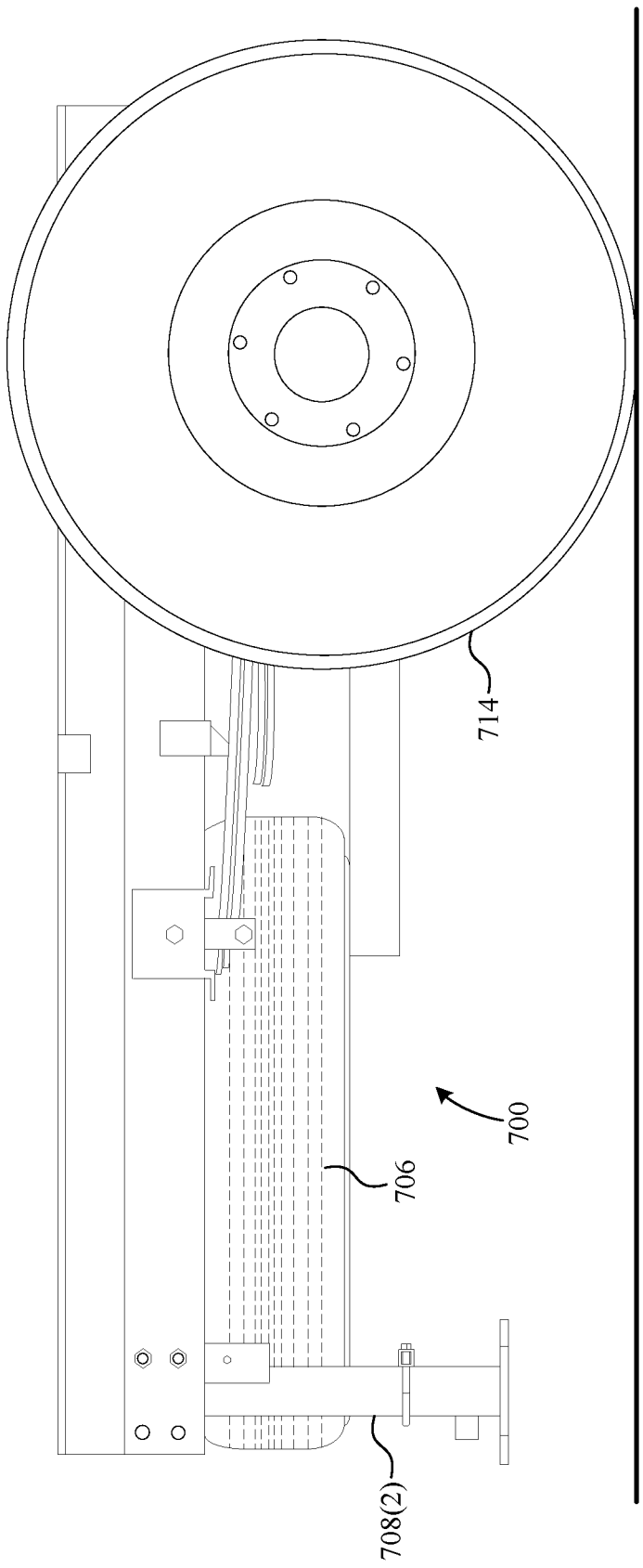
FIG. 9A is a side view of the jacks of FIG. 7 in an unactuated position.

FIG. 9A is a side view of the rear portion of vehicle 700, while jacks 708(1-2) are in a stowed position (only jack 708(2) shown). It should be noted that rear wheels 714 are resting on the ground and there is significant clearance between jacks 708(1-2) and the ground. Additionally, cross-member 814 is disposed sufficiently lower than spare tire 706 to allow for removing spare tire 706 for use without removing jacks 708.

Figure 9B:
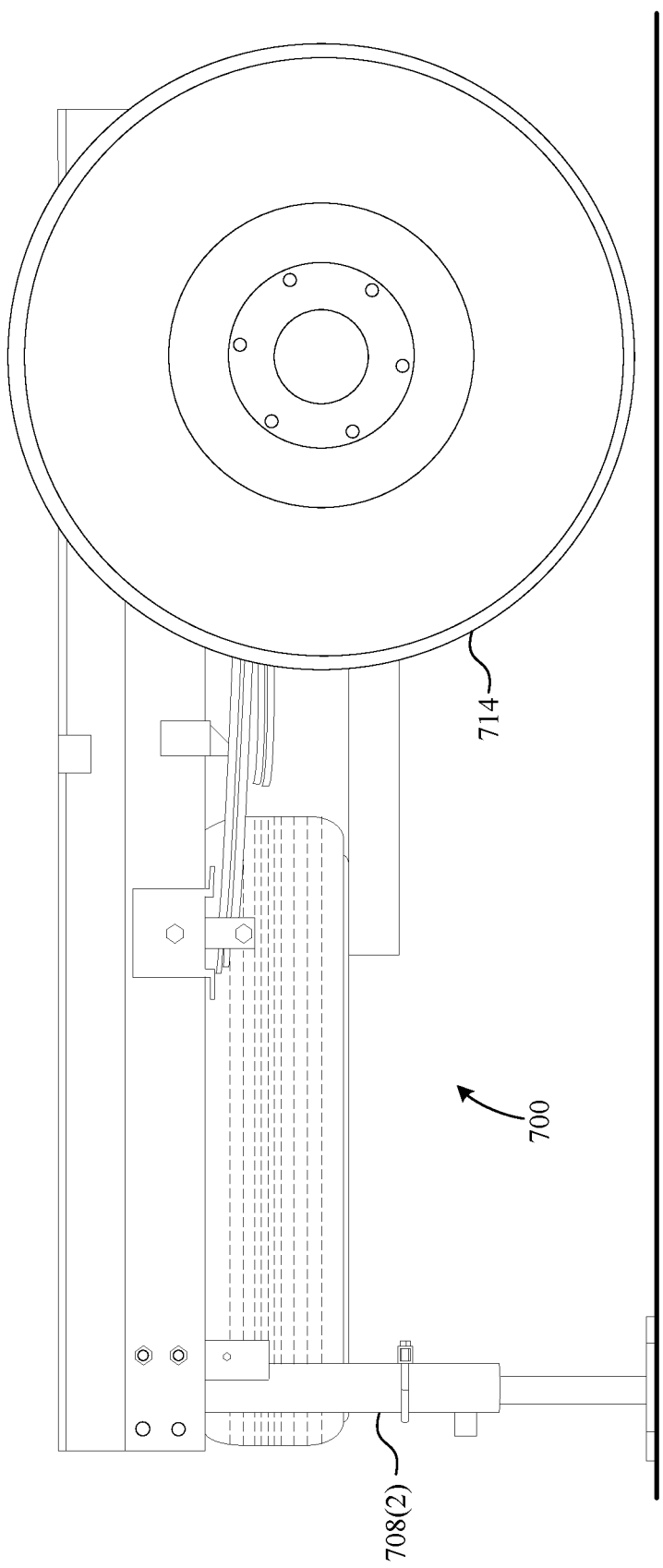
FIG. 9B is a side view of the jacks of FIG. 7 in an actuated position.

FIG. 9B is a side view of the rear portion of vehicle 700, while jacks 708(1-2) are in an deployed position. It should be noted that rear wheels 714 are raised off of the ground, while foot pads 818 of jacks 708(1-2) are pressing on the ground.

Several embodiments of jacks according to the invention have now been described. It will be readily apparent that such embodiments do not have to be used in isolation. For example, the jacks 202 and the jacks 708 can be used on the same vehicle. More particularly, a pair of jacks 202 might be used in the front under the passenger cabin of the vehicle, while a pair of jacks 708 might be attached to the rear of the frame. Additionally, the jacks 202 and 708 can be placed inboard and/or outboard of the frame rails as discussed above as the application requires.

Moreover, while jacks 106 and 708 have been described as assembled units, it should be recognized that U-bracket 204, L-brackets 206, J-brackets 214, and the associated fasteners can be provided as a kit for retrofitting an existing jack, for example, by welding U-bracket 204 thereto. Similarly, U-bracket 810 and fasteners 812 associated with jack 708 can also be provided as a kit to retrofit a jack.

Figure 10:
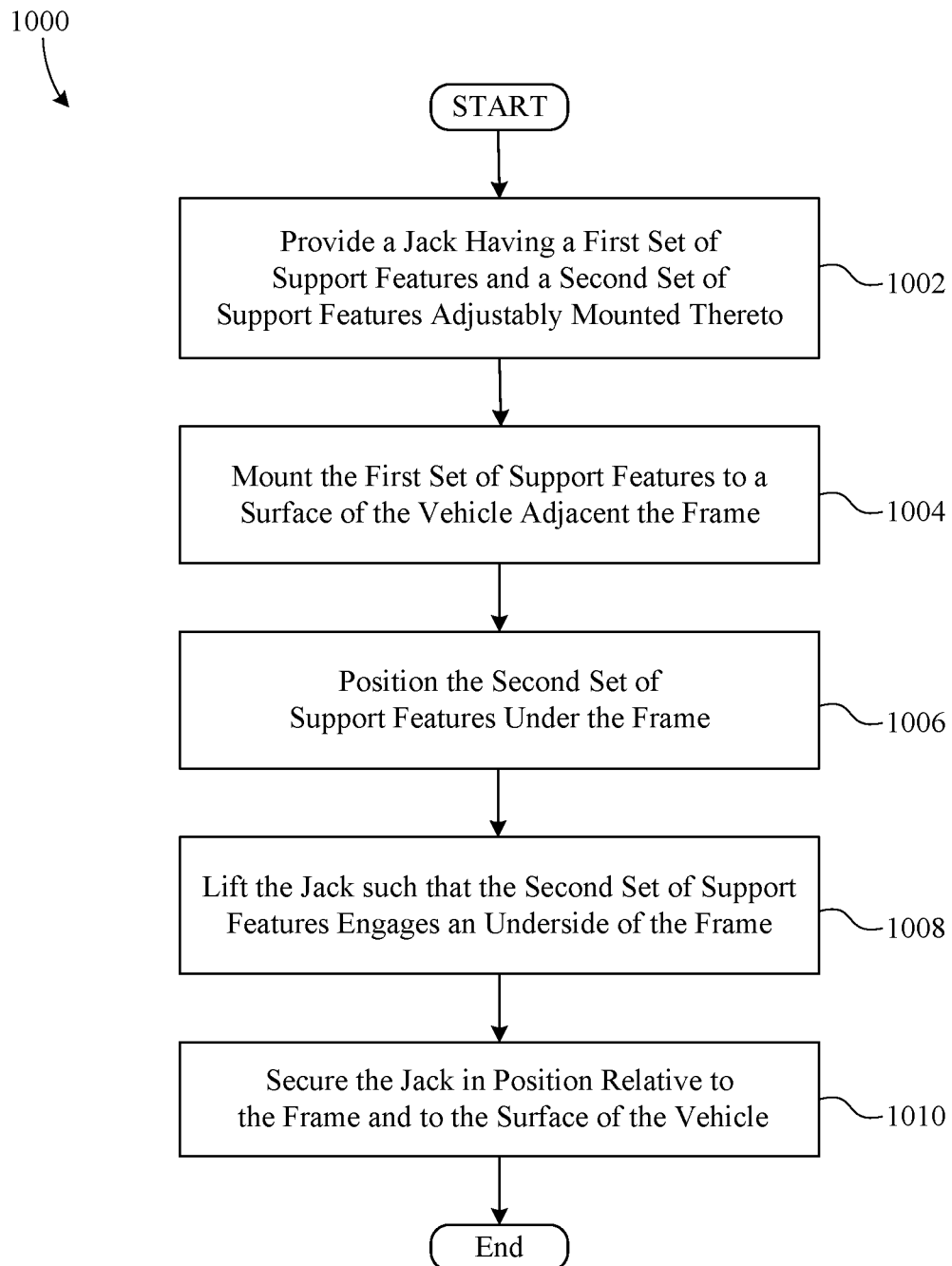
FIG. 10 is a flow-chart summarizing an exemplary method of installing a leveling system on a vehicle frame.

FIG. 10 shows a flowchart summarizing an exemplary method 1000 of mounting a jack of a leveling system to a vehicle according to the invention. In a first step 1002, a jack having a first set of support features (e.g., a first set of brackets, etc.) and a second set of support features (e.g., a second set of brackets, etc.) adjustably mounted thereto is provided. In a second step 1004, the first set of support features are mounted to a surface (e.g., a floor, etc.) of the vehicle adjacent the frame of the vehicle. In a third step 1006, the second set of support features is positioned under the frame, and in a fourth step 1008, the jack is lifted such that the second set of support features engages an underside of the frame. In a fifth step 1010, the jack is secured in position relative to the frame and to the surface of the vehicle, for example, by securing the first and second sets of support features to the jack and securing the first set of support features to the surface of the vehicle.

Figure 11:
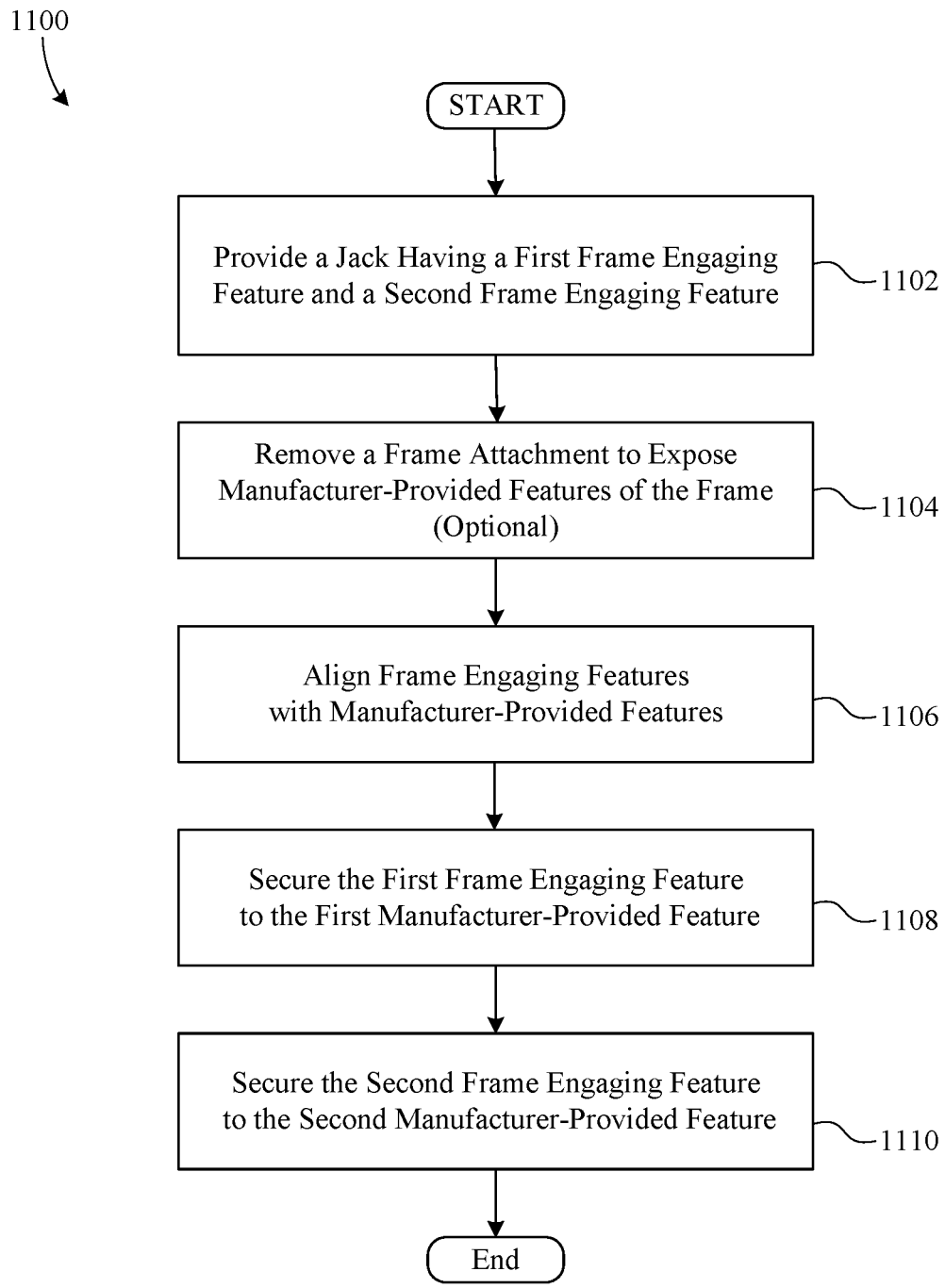
FIG. 11 is a flow-chart summarizing another exemplary method of installing a leveling system on a vehicle frame.

FIG. 11 shows a flowchart summarizing another exemplary method 1100 of mounting a jack of a leveling system to a vehicle according to the invention. In a first step 1102, a jack including a first frame engaging feature and a second frame engaging feature is provided. In an optional second step 1104, a frame attachment is removed from the frame to expose manufacturer-provided features of the frame. In a third step 1106, the jack is aligned with the frame such that the first frame engaging feature is aligned with a first manufacturer-provided feature of the frame and the second frame engaging feature is aligned with a second manufacturer-provided feature of the frame. In a fourth step 1108, the first frame engaging feature is secured to the first manufacturer-provided feature, and in a fifth step 1110, the second frame engaging feature is secured to the second manufacturer-provided feature.

Figure 12:
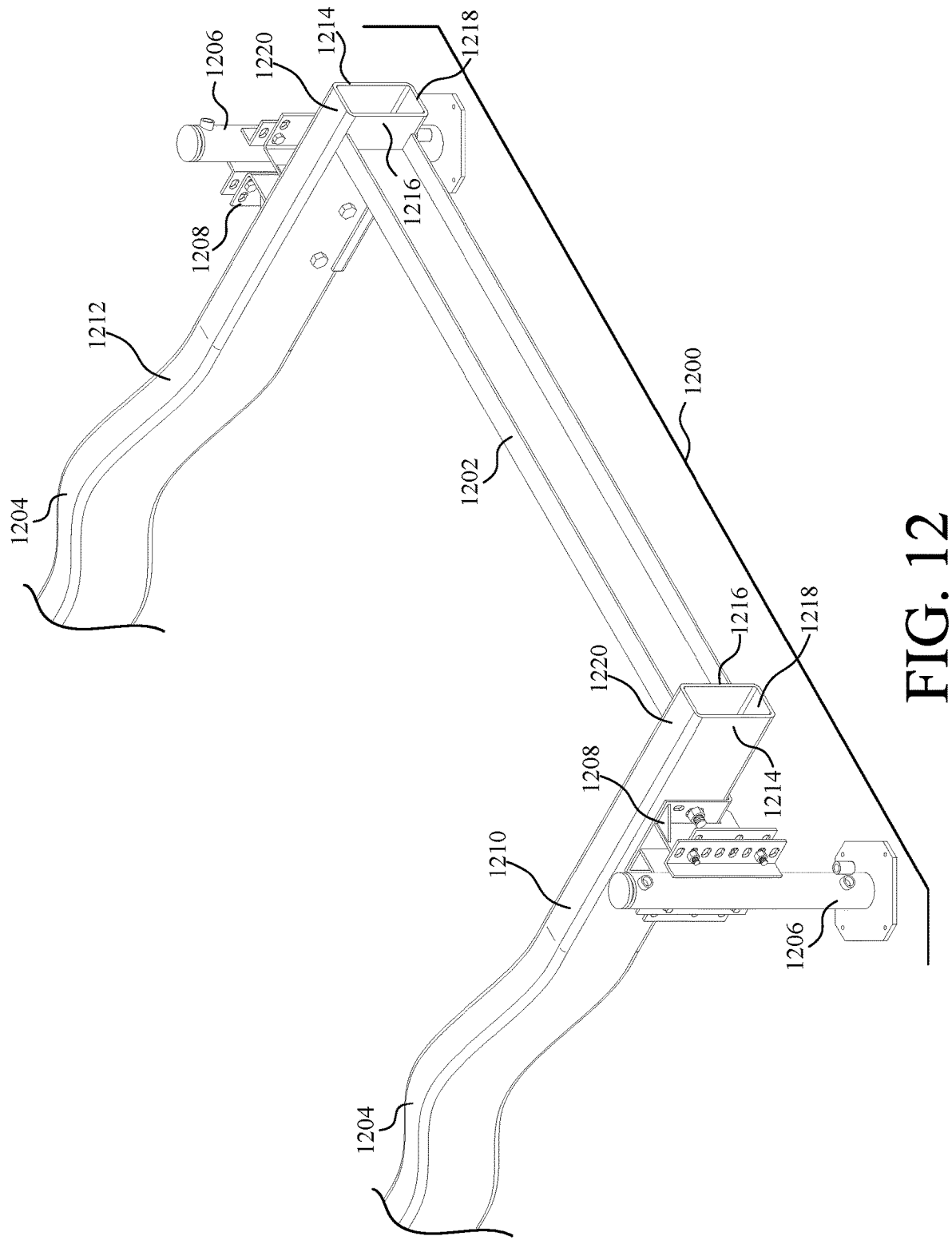
FIG. 12 is a perspective view of a vehicle leveling system mounted on a vehicle frame.

FIG. 12 shows a perspective view of a vehicle leveling system 1200 according to another embodiment of the present invention. System 1200 is shown mounted to a vehicle frame 1202, just behind the rear axle arches 1204, without modifying (e.g., cutting, welding, etc.) frame 1202.

Frame 1202 includes a first member 1210 and a second member 1212, which are both tubular structures. Each of members 1210 and 1212 include a first lateral wall 1214, a second lateral wall 1216, a bottom wall 1218 and a top wall 1220. Furthermore, system 1200 includes a set of jacks 1206 adjustably mounted to frame 1202 by a respective set of frame engaging brackets 1208. Jacks 1206 are, for example, hydraulic jacks that are extendable between a stowed position (FIG. 16A) and a deployed position (FIG. 16B).

Figure 13:
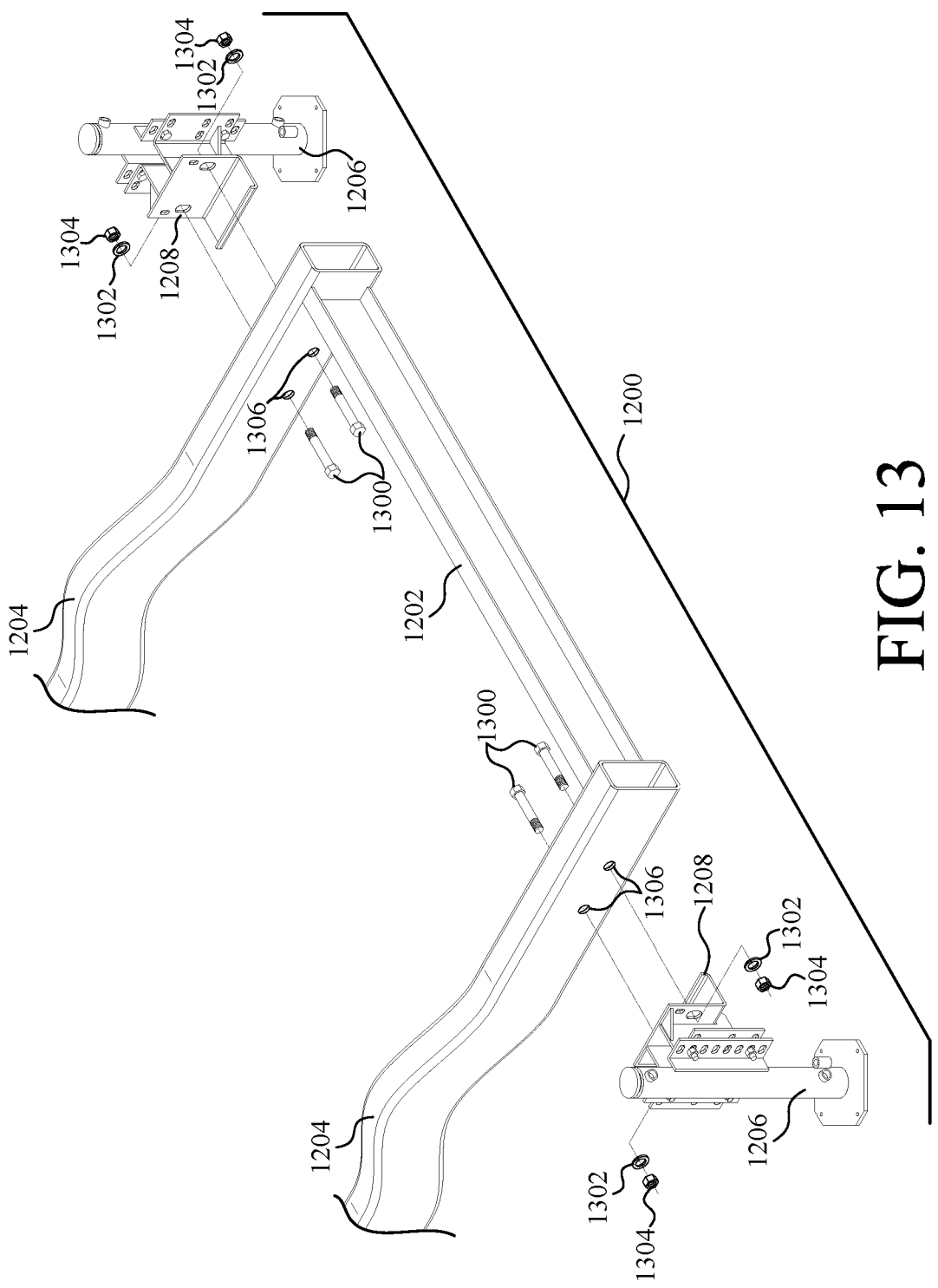
FIG. 13 is a perspective view of the vehicle leveling system of FIG. 12 exploded from the frame.

FIG. 13 shows a perspective view of vehicle leveling system 1200 exploded from frame 1202. System 1200 mounts to frame 1202 with a set of four bolts 1300, four lock-washers 1302, and four nuts 1304. Frame 1202 includes four apertures 1306 formed originally during the manufacturing of frame 1202. System 1200 can, therefore, advantageously mount frame 1202 with no need to modify frame 1202.

Figure 14:
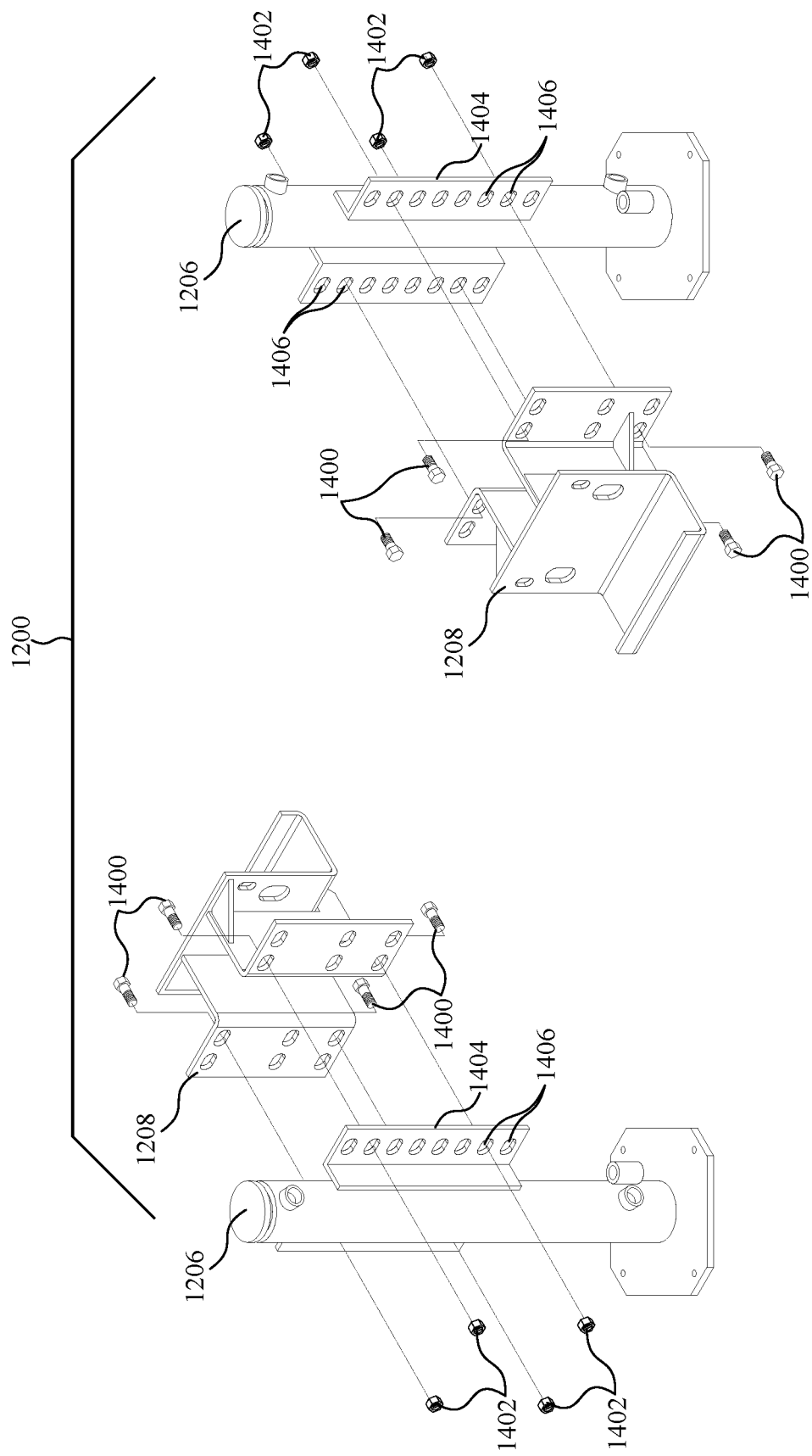
FIG. 14 is an exploded perspective view of the vehicle leveling system of FIG. 12.

FIG. 14 shows an exploded perspective view of system 1200. As shown, each of jacks 1206 adjustably mounts to a respective one of brackets 1208 with a set of four bolts 1400 and four nuts 1402. Each of jacks 1206 includes a set of mounting brackets 1404 fixed thereto. Brackets 1206 include a vertical column of apertures 1406 for selectively adjusting the vertical fixed position of jacks 1206 with respect to brackets 1208, by selecting which of apertures 1406 are used to mount jacks 1206 to brackets 1208. Of course, by adjusting the vertical position of jacks 1206 with respect to brackets 1208, the vertical position of jacks 1206 with respect to frame 1202 is also adjusted. In the example embodiment, apertures 1406 are horizontal elongated slots to facilitate the horizontal adjustment of jacks 1206 with respect to brackets 1208.

Figure 15:
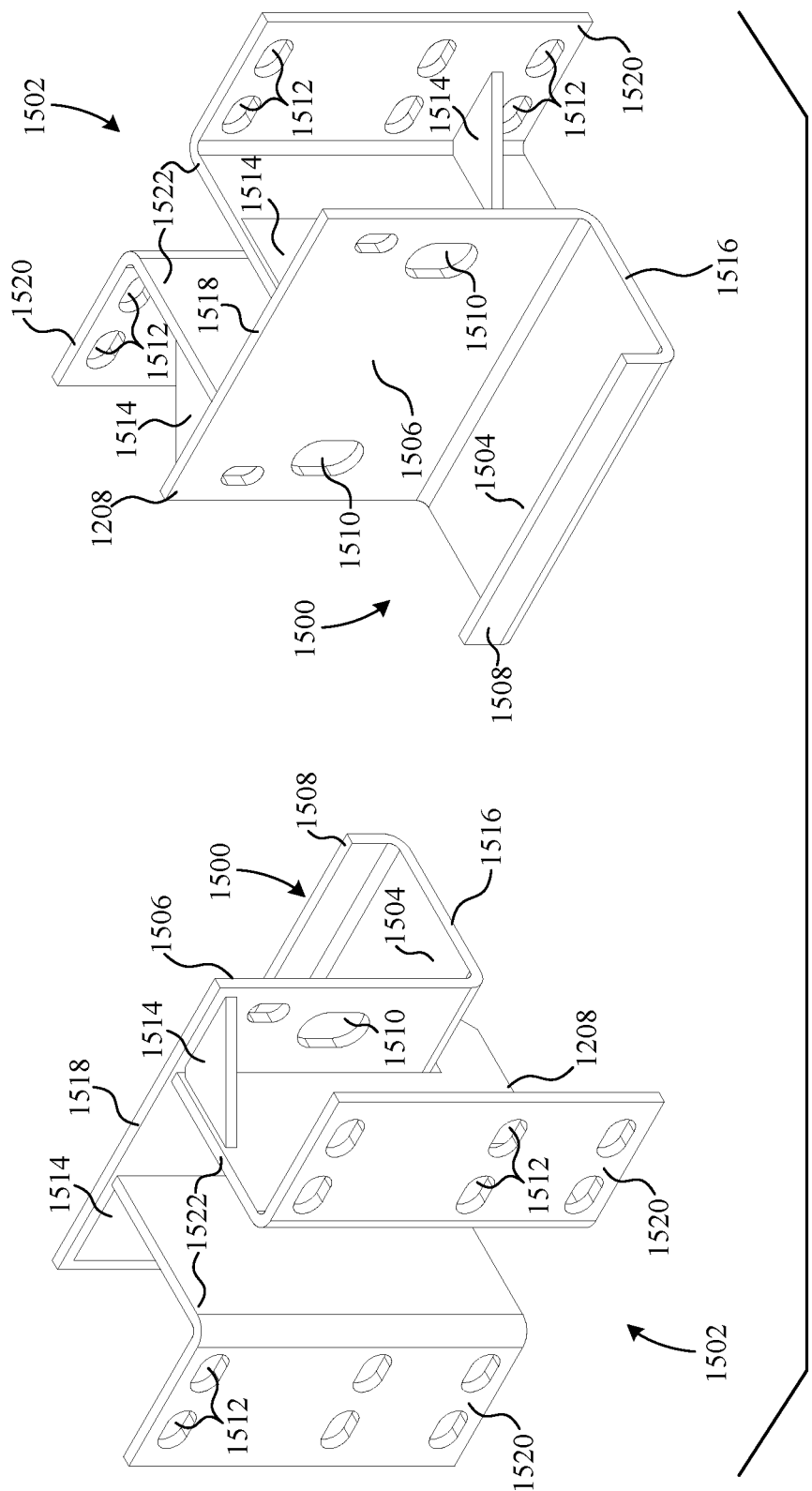
FIG. 15 is a perspective view of the frame engaging brackets of the system of FIG. 12.

FIG. 15 shows a perspective view of brackets 1208 removed from system 1200. Each of brackets 1208 includes a frame mounting portion 1500 and a jack mounting portion 1502, which are configured to be mounted to frame 1202 and jack 1206, respectively.

Frame mounting portion 1500 includes a horizontal surface 1504, a vertical surface 1506, and a lip 1508. Horizontal surface 1504 is adapted to engage, and urge against, the bottom surface of frame 1202 when jacks 1206 are deployed. Vertical surface 1506 is adapted to engage the planar, outer, vertical surface of frame 1202. Furthermore, vertical surface 1506 defines a plurality of apertures 1510 through which bolts 1300 (shown in FIG. 3) are disposed to mount brackets 1208 to frame 1202. Apertures 1510 are vertical elongated slots which allow horizontal surfaces 1504 of brackets 1208 to be moved up as tight as possible against frame 1202.

Horizontal surface 1504 is part of a transverse structure 1516 of bracket 1208. Transverse structure 1516 extends from first sidewall 1518 to lip 1508. Horizontal surface 1504 engages the bottom of first lateral sidewall 1214 of frame 1204, vertical surface 1506 is part of a first sidewall 1518 of bracket 1208 that engages first lateral wall 1214 of frame 1204, and lip 1508 is a second sidewall of bracket 1208 that engages second lateral wall 1216 of frame 1204. Bracket 1208 further includes a pair of third sidewalls 1520 and a pair of fourth sidewalls 1522. Third sidewalls 1520 are configured to mount to mounting bracket 1404, and fourth sidewalls 1522 are disposed transversely between first sidewall 1518 and third sidewalls 1520.

When system 1200 is coupled to frame 1202, bolts 1300 are left slightly loose while jacks 1206 are deployed such that the weight of the vehicle is urging down against horizontal surface 1504. While the weight of the vehicle is urging against horizontal surfaces 1504, bolts 1300 are tightened, thus securing brackets 1208 to frame 1202. Lip 1508 is configured to engage the planar vertical inner surface of frame 1202, such that frame 1202 is interposed between lip 1508 and vertical surface 1506. Together, vertical surface 1506 and lip 1508 restrain rotation of brackets 1208 with respect to frame 1202.

Jack mounting region 1502 includes three horizontal rows of apertures 1512 that facilitate selective horizontal and vertical adjustment of bracket 1208 with respect to jack 1206. As shown, each of apertures 1512 is a horizontal elongated slot configured to receive a bolt 1400. Bracket 1208 further includes a plurality of gussets 1514, which provide structural reinforcement to bracket 1208.

Figure 16A:
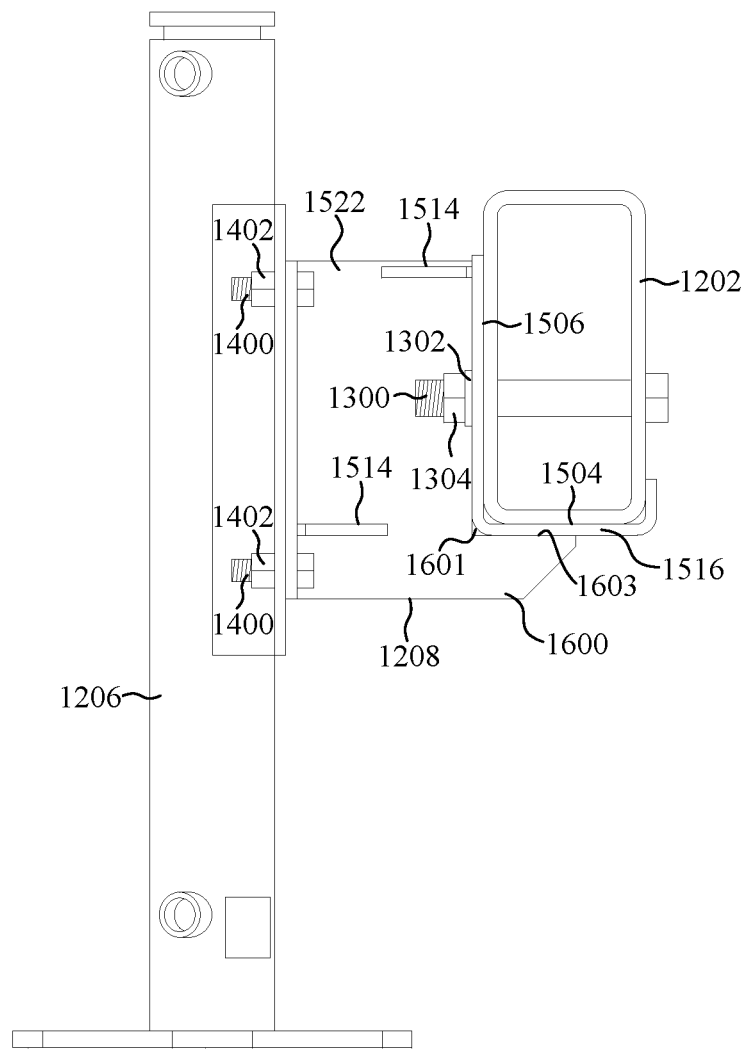
FIG. 16A is a side view of one of the frame engaging brackets of the system of FIG. 12 mounted to a vehicle frame with a jack in a stowed position.
Figure 16B:
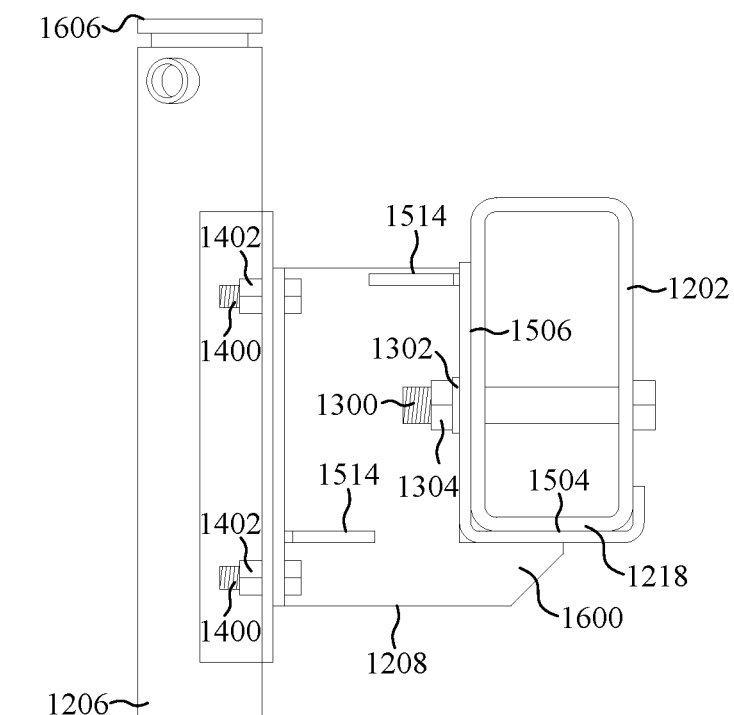
FIG. 16B is a side view of one of the frame engaging brackets of the system of FIG. 12 mounted to a vehicle frame with the jack of FIG. 16A in a deployed position.

FIG. 16A is a side view of one of brackets 1208 mounted to frame 1202, with jack 1206 in a stowed position. Bracket 1208 further includes a set of two rear supports 1600, only one of which is visible in the view of FIG. 16.

As shown in the side view, fourth sidewalls 1522 define a notch 1601 that forms a supporting surface 1603, whereon transverse structure 1516 is seated.

FIG. 16B is a side view of bracket 1208 with jack 1206 in a deployed position, with a lower portion 1602 of jack 1206 extending from an upper portion 1604 of jack 1206.

As shown, the top surface 1606 of upper portion 1604 of jack 1206 is disposed above bottom wall 1218 and the uppermost portion of bracket 1208 when bracket 1208 is secured to frame 1202.

Figure 17:
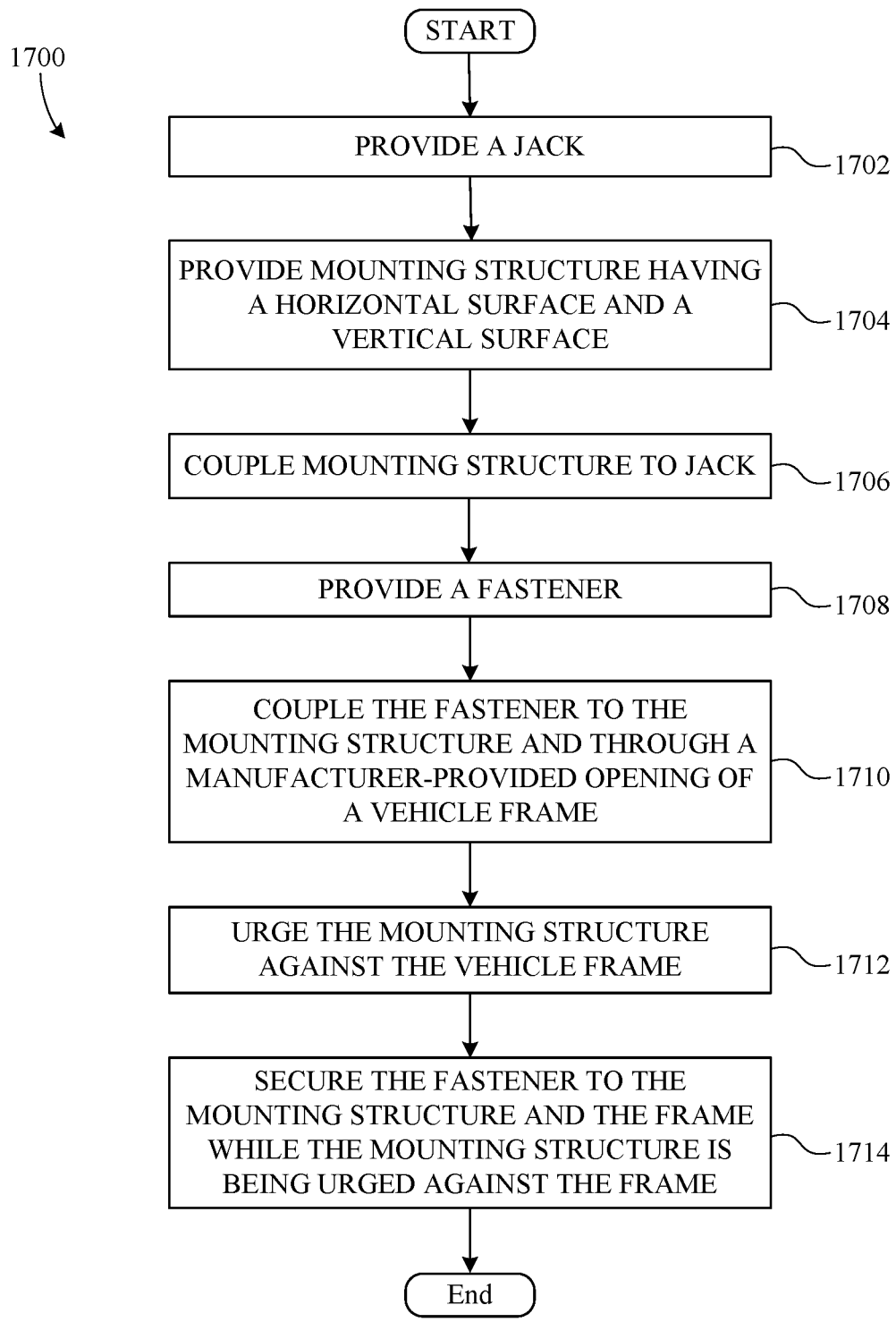
FIG. 17 is a flow-chart summarizing an exemplary method of installing a leveling system on a vehicle frame.

FIG. 17 is a flowchart summarizing a method 1700 for attaching a leveling system to a vehicle frame. In a first step 1702, a jack is provided. Then, in a second step 1704, a mounting structure having a horizontal surface and a vertical surface is provided. Next, in a third step 1706, the mounting structure is coupled to the jack. Then, in a fourth step 1708, a fastener is provided. Next, in a fifth step 1710, the fastener is coupled to the mounting structure and through a manufacturer-provided opening of a vehicle frame. Then, in a sixth step 1712, the mounting structure is urged against the vehicle frame. Finally, in a seventh step 1714, the fastener is secured to the mounting structure and the frame while the mounting structure is being urged against the frame. The particular order of the steps of method 1700 can be altered. For example, the jack can be coupled to the mounting structure after the mounting structure is secured to the frame.

The description of particular embodiments of the present invention is now complete. Many of the described features may be substituted, altered or omitted without departing from the scope of the invention. For example, alternative brackets between the jack cylinder and frame (e.g., one that receives force from the top of the jack cylinder, etc.) can be employed. As another example, although some example embodiments were described with respect to the rear of a vehicle, either embodiment could be used to fix a jack near the front of a vehicle, by using the floor of the cab or the attachment point of the front bumper. As still another example, a different cross-member/brace (e.g., a flat plate, etc.) could be used between adjacent jacks to stabilize them. These and other deviations from the particular embodiments shown will be apparent to those skilled in the art, particularly in view of the foregoing disclosure.

We claim:

1. A method for attaching a leveling system to a vehicle frame, said method comprising: providing a hydraulic jack having an upper portion and a lower portion extendable with respect to said upper portion; providing a frame engaging bracket defining a first aperture configured to align with a respective manufacturer-provided aperture of said vehicle frame; providing a first fastener; coupling said frame engaging bracket to said jack; aligning said first aperture of said frame engaging bracket with said manufacturer-provided aperture of said vehicle frame; disposing said first fastener through said first aperture of said frame engaging bracket and said manufacturer-provided aperture of said vehicle frame; and securing said first fastener to said frame engaging bracket and said vehicle frame; and wherein said vehicle frame includes a first member, said first member of said vehicle frame including a first lateral wall, a second lateral wall, and a bottom wall; said frame engaging bracket includes a transverse structure, a first side wall, and a second side wall, said transverse structure having a supporting surface extending from said first sidewall to said second sidewall; said supporting surface is disposed beneath and facing said bottom wall of said first member of said vehicle frame when said frame engaging bracket is secured to said first member of said vehicle frame; said first side wall of said frame engaging bracket includes a first surface facing said first lateral wall of said first member of said vehicle frame when said frame engaging bracket is secured to said first member of said vehicle frame; said second side wall of said frame engaging bracket includes a second surface facing said second lateral wall of said first member of said vehicle frame when said frame engaging bracket is secured to said first member of said vehicle frame;
   said upper portion of said jack remains in a fixed position with respect to said frame engaging bracket when said frame engaging bracket is secured to said first member of said vehicle frame;
   wherein a top surface of said upper portion of said jack is disposed above said bottom wall of said first member of said vehicle frame when said frame engaging bracket is secured to said first member of said vehicle frame; and
   wherein said top surface of said upper portion of said jack is disposed above an uppermost portion of said frame engaging bracket when said frame engaging bracket is secured to said first member of said vehicle frame.

2. The method of claim 1, wherein:
   said frame engaging bracket includes a third side wall;
   said jack includes a mounting bracket disposed on a side of said upper portion of said jack; and
   said step of coupling said frame engaging bracket to said jack includes attaching said third side wall of said frame engaging bracket to said mounting bracket of said jack.

3. The method of claim 2, wherein:
   said third side wall of said frame engaging bracket defines an aperture extending horizontally through said third side wall;
   said mounting bracket of said jack defines an aperture extending horizontally through said mounting bracket of said jack; and
   said step of coupling said frame engaging bracket to said jack includes aligning said aperture of said third side wall of said frame engaging bracket with said aperture of said mounting bracket of said jack and disposing a fastener through both said aperture of said third side wall of said frame engaging bracket and said aperture of said mounting bracket of said jack.

4. The method of claim 3, wherein at least one of said aperture of said third side wall of said frame engaging bracket and said aperture of said mounting bracket of said jack is an elongated slot.

5. The method of claim 2, wherein:
   said frame engaging bracket further includes a fourth side wall extending between said first side wall of said frame engaging bracket and said third side wall of said frame engaging bracket;
   said fourth side wall of said frame engaging bracket is oriented transversely with respect to said first side wall of said frame engaging bracket and said third side wall of said frame engaging bracket.

6. The method of claim 5, wherein:
   said fourth side wall of said frame engaging bracket defines a notch;
   said first side wall of said frame engaging bracket and said transverse structure of said frame engaging bracket are disposed in said notch of said fourth side wall of said frame engaging bracket.

7. The method of claim 1, wherein said first member of said vehicle frame is tubular.

8. The method of claim 1, wherein said jack includes a hydraulic cylinder.

9. A vehicle comprising a vehicle frame and a leveling system, said leveling system comprising: a hydraulic jack having an upper portion and a lower portion extendable with respect to said upper portion; a frame engaging bracket defining a first aperture configured to align with a respective manufacturer-provided aperture of said vehicle frame; and a first fastener; and wherein said frame engaging bracket is coupled to said jack; said first aperture of said frame engaging bracket is aligned with said manufacturer-provided aperture of said vehicle frame; said first fastener is disposed through said first aperture of said frame engaging bracket and said manufacturer-provided aperture of said vehicle frame; said first fastener is secured to said frame engaging bracket and said vehicle frame; said vehicle frame includes a first member, said first member of said vehicle frame including a first lateral wall, a second lateral wall, and a bottom wall; said frame engaging bracket includes a transverse structure, a first side wall, and a second side wall, said transverse structure having a supporting surface extending from said first sidewall to said second sidewall; said supporting surface is disposed beneath and facing said bottom wall of said first member of said vehicle frame; said first side wall of said frame engaging bracket includes a first surface facing said first lateral wall of said first member of said vehicle frame; said second side wall of said frame engaging bracket includes a second surface facing said second lateral wall of said first member of said vehicle frame;

said upper portion of said jack remains in a fixed position with respect to said frame engaging bracket when said frame engaging bracket is secured to said first member of said vehicle frame;

wherein a top surface of said upper portion of said jack is disposed above said bottom wall of said first member of said vehicle frame; and wherein said top surface of said upper portion of said jack is disposed above an uppermost portion of said frame engaging bracket.

10. The vehicle of claim 9, wherein:
said frame engaging bracket includes a third side wall;
said jack includes a mounting bracket disposed on a side of said upper portion of said jack; and
said third side wall of said frame engaging bracket secured to said mounting bracket of said jack.

11. The vehicle of claim 10, wherein:
said third side wall of said frame engaging bracket defines an aperture extending through said third side wall;
said mounting bracket of said jack defines an aperture extending through said mounting bracket of said jack;
said aperture of said third side wall of said frame engaging bracket is aligned with said aperture of said mounting bracket of said jack; and
a fastener is disposed through both said aperture of said third side wall of said frame engaging bracket and said aperture of said mounting bracket of said jack.

12. The vehicle of claim 11, wherein at least one of said aperture of said third side wall of said frame engaging bracket and said aperture of said mounting bracket of said jack is an elongated slot.

13. The vehicle of claim 10, wherein:
said frame engaging bracket further includes a fourth side wall extending between said first side wall of said frame engaging bracket and said third side wall of said frame engaging bracket; and
said fourth side wall of said frame engaging bracket is oriented transversely with respect to said first side wall of said frame engaging bracket and said third side wall of said frame engaging bracket.

14. The vehicle of claim 13, wherein:
said fourth side wall of said frame engaging bracket defines a notch; and
said first side wall of said frame engaging bracket and said transverse structure of said frame engaging bracket are disposed in said notch of said fourth side wall of said frame engaging bracket.

15. The vehicle of claim 9, wherein said first member of said vehicle frame is tubular.

16. The vehicle of claim 9, wherein said jack includes a hydraulic cylinder.

* * * * *